(12) United States Patent
Sun et al.

(10) Patent No.: US 10,840,989 B2
(45) Date of Patent: *Nov. 17, 2020

(54) METHOD AND SYSTEM FOR MEASURING A CHANNEL QUALITY INDICATOR, USER EQUIPMENT AND BASE STATION

(71) Applicant: Huawei Technologies Co., Ltd., Shenzhen (CN)

(72) Inventors: Jingyuan Sun, Shenzhen (CN); Yongxing Zhou, Beijing (CN); David Mazzarese, Beijing (CN); Xiaotao Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,278

(22) Filed: Dec. 20, 2018

(65) Prior Publication Data

US 2019/0123802 A1 Apr. 25, 2019

Related U.S. Application Data

(63) Continuation of application No. 15/836,360, filed on Dec. 8, 2017, now Pat. No. 10,200,104, which is a (Continued)

(30) Foreign Application Priority Data

Nov. 7, 2011 (CN) .......................... 2011 1 0348361

(51) Int. Cl.
H04B 7/06 (2006.01)
H04B 17/345 (2015.01)
(Continued)

(52) U.S. Cl.
CPC ......... *H04B 7/0632* (2013.01); *H04B 17/345* (2015.01); *H04L 1/0026* (2013.01);
(Continued)

(58) Field of Classification Search
None
See application file for complete search history.

(56) References Cited

U.S. PATENT DOCUMENTS

2011/0013710 A1* 1/2011 Xiao ...................... H04B 7/024
375/260
2011/0275394 A1* 11/2011 Song ................... H04W 72/082
455/509
(Continued)

FOREIGN PATENT DOCUMENTS

CN 101646242 A 2/2010
CN 101827387 A 9/2010
(Continued)

OTHER PUBLICATIONS

Huawei et al., "Specification of Resource-Specific Measurements", 3GPP Draft; RI-105257, 3rd Generation Partnership Project (3GPP), 3GPP TSG RAN WG1, Meeting #62 bis, Xi'an, China, 4 pages (Oct. 11-15, 2010).

(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

Embodiments of the present invention provide a method and a system for measuring a channel quality indicator, a user equipment and a base station. The method includes: obtaining a channel quality indicator configuration, where the channel quality indicator configuration includes a first combination, and the first combination includes a valid signal
(Continued)

processing manner and an interfering signal processing manner; performing valid signal processing and interfering signal processing according to the valid signal processing manner and the interfering signal processing manner in the first combination to obtain a valid signal and an interfering signal; performing channel quality indicator calculation according to the valid signal and the interfering signal to obtain a channel quality indicator; and feeding the channel quality indicator back to a base station.

16 Claims, 4 Drawing Sheets

Related U.S. Application Data continuation of application No. 14/267,581, filed on May 1, 2014, now Pat. No. 9,871,573, which is a continuation of application No. PCT/CN2012/084225, filed on Nov. 7, 2012.

(51) Int. Cl.
  *H04W 52/24* (2009.01)
  *H04L 1/00* (2006.01)
  *H04W 24/08* (2009.01)
  *H04B 7/0456* (2017.01)

(52) U.S. Cl.
  CPC ......... *H04W 24/08* (2013.01); *H04W 52/243* (2013.01); *H04B 7/0456* (2013.01); *H04B 7/0639* (2013.01)

(56) References Cited

U.S. PATENT DOCUMENTS

| | | | | |
|---|---|---|---|---|
| 2012/0082052 | A1* | 4/2012 | Oteri | H04W 24/10 370/252 |
| 2012/0083280 | A1* | 4/2012 | Liu | H04W 16/14 455/446 |
| 2012/0093012 | A1* | 4/2012 | Pedersen | H04B 7/0626 370/252 |
| 2012/0140694 | A1 | 6/2012 | Sun et al. | |
| 2012/0157082 | A1* | 6/2012 | Pedersen | H04W 24/10 455/422.1 |
| 2012/0207043 | A1* | 8/2012 | Geirhofer | H04L 5/0048 370/252 |
| 2012/0208547 | A1* | 8/2012 | Geirhofer | H04B 7/0626 455/452.2 |
| 2012/0213137 | A1* | 8/2012 | Jeong | H04W 52/0212 370/311 |
| 2012/0252487 | A1* | 10/2012 | Siomina | G01S 5/0205 455/456.1 |
| 2012/0264449 | A1* | 10/2012 | Kazmi | G01S 5/0205 455/456.1 |
| 2012/0327821 | A1* | 12/2012 | Lin | H04W 72/048 370/280 |
| 2013/0017793 | A1* | 1/2013 | Henttonen | H04W 52/52 455/63.1 |
| 2013/0021926 | A1* | 1/2013 | Geirhofer | H04L 5/0048 370/252 |
| 2013/0028182 | A1* | 1/2013 | Geirhofer | H04L 5/0051 370/328 |
| 2013/0033998 | A1* | 2/2013 | Seo | H04J 11/0056 370/252 |
| 2013/0107832 | A1* | 5/2013 | Kim | H04B 7/024 370/329 |
| 2013/0196675 | A1* | 8/2013 | Xiao | H04W 24/08 455/452.1 |

FOREIGN PATENT DOCUMENTS

| | | |
|---|---|---|
| CN | 101834701 A | 9/2010 |
| CN | 101997587 A | 3/2011 |
| WO | 2011006451 A1 | 1/2011 |

OTHER PUBLICATIONS

LG Electronics, "Considerations on measurement mismatch problem", 3GPP Draft, R1-110380, 3rd Generation Partnership Project (3GPP), 3GPP TSG RAN WG1 Meeting #63 bis, Dublin, Ireland, 6 pages (Jan. 11, 2011).

Catt, "Discusson on CSI Configuration of eICIC", 3GPP Draft, R2-110381, 3rd Generation Partnership Project (3GPP), 3GPP TSG RAN WG2 Meeting #72 bis, Dublin, Ireland, 4 pages (Jan. 11, 2011).

Samsung, "CSI measurement restriction for macro-pico scenarios", 3GPP Draft, R1-106049, 3rd Generation Partnership Project (3GPP), 3GPP TSG RAN WG1 Meeting #63 bis, Jacksonville, USA, 4 pages (Nov. 10, 2010).

Huawei et al., "Measurement Definitions for Resource-Restricted Measurements", 3GPP Draft, R1-110020, 3rd Generation Partnership Project (3GPP), 3GPP TSG RAN WG1 Meeting #63 bis, Dublin, Ireland, 6 pages (Jan. 11, 2011).

Qualcomm Incorporated, "eICIC Aperiodic CSI Feedback Restriction", 3GPP Draft, R4-110220, 3rd Generation Partnership Project (3GPP), 3GPP TSG RAN WG4, Austin, USA, 8 pages (Jan. 12, 2011).

3GPP TS 36.213 V10.3.0, "3rd Generation Partnership Project-;Technical Specification Group Radio Access Network; Evolved Universal Terrestrial Radio Access (E-UTRA); Physical layer procedures (Release 10)", pp. 1-122 (Sep. 2011).

ZTE, "Discussion on CRS interference and CSI measurements in macro-pico deployment", 3GPP TSG RAN WG1 Meeting #63 bis, R1-105969, Jacksonville, United States, 4 pages (Nov. 15-19, 2010).

\* cited by examiner

METHOD AND SYSTEM FOR MEASURING A CHANNEL QUALITY INDICATOR, USER EQUIPMENT AND BASE STATION

CROSS REFERENCE TO RELATED APPLICATIONS

This application is a continuation of U.S. patent application Ser. No. 15/836,360, filed on Dec. 8, 2017, now U.S. Pat. No. 10,200,104, which is a continuation of U.S. patent application Ser. No. 14/267,581, filed on May 1, 2014, now U.S. Pat. No. 9,871,573, which is a continuation of International Patent Application No. PCT/CN2012/084225, filed on Nov. 7, 2012, which claims priority to Chinese Patent Application No. 201110348361.1, filed on Nov. 7, 2011. All of the afore-mentioned patent applications are hereby incorporated by reference in their entireties.

TECHNICAL FIELD

Embodiments of the present invention relate to the field of communications technologies, and in particular, to a method and a system for measuring a channel quality indicator, a user equipment and a base station.

BACKGROUND

In the prior art, a UE performs channel quality indicator (Channel Quality Indicator; CQI for short) measurement processing, and reports a result CQI obtained through measurement processing to a base station. The base station performs radio resource scheduling according to CQIs reported by all UEs.

Generally, when a UE performs CQI measurement processing, it is required to perform measurement processing on a signal part and an interfering part separately, so as to calculate a CQI. For measurement on the interfering part, the UE only measures interference on one type of fixed resource. For the measurement processing on the signal part, the UE may perform signal measurement and processing according to a transmission mode; then the UE calculates a signal to interference plus noise ratio (Signal to Interference plus Noise Ratio; SINR for short) according to a measurement result of the signal part and a measurement result of the interfering part, and further performs quantization on the SINR to obtain a CQI.

During implementation of the present invention, the CQI measurement processing of the prior art cannot be applied to a multi-node collaboration system.

SUMMARY

Embodiments of the present invention provide a method and a system for measuring a channel quality indicator, a user equipment and a base station, which are used for solving that CQI measurement cannot be applied to a multi-node collaboration system in the art, thereby providing a channel quality indicator measurement solution applicable to a multi-node collaboration system.

In a first aspect according to the present invention, a method for measuring a channel quality indicator is provided and includes:

obtaining a channel quality indicator configuration, where the channel quality indicator configuration includes a first combination, and the first combination includes a valid signal processing manner and an interfering signal processing manner;

performing valid signal processing and interfering signal processing according to the valid signal processing manner and the interfering signal processing manner in the first combination to obtain a valid signal and an interfering signal;

performing channel quality indicator calculation according to the valid signal and the interfering signal to obtain a channel quality indicator; and feeding the channel quality indicator back to a base station.

In one aspect, in the method for measuring a channel quality indicator, the obtaining the channel quality indicator configuration from the base station, where the channel quality indicator configuration includes the first combination, includes:

obtaining one channel quality indicator configuration from the base station, where the one channel quality indicator configuration includes at least one first combination;

the performing valid signal processing and interfering signal processing according to the valid signal processing manner and the interfering signal processing manner in the first combination to obtain a valid signal and an interfering signal includes:

performing valid signal processing and interfering signal processing according to a valid signal processing manner and an interfering signal processing manner of each first combination of the at least one first combination to obtain one valid signal and one interfering signal corresponding to each first combination of the at least one first combination;

the performing channel quality indicator calculation according to the valid signal and the interfering signal to obtain a channel quality indicator includes:

performing channel quality indicator calculation according to one valid signal and one interfering signal corresponding to each first combination of the at least one first combination to obtain at least one channel quality indicator corresponding to the at least one first combination; and the feeding the channel quality indicator back to a base station includes:

feeding the at least one channel quality indicator corresponding to the at least one first combination back to the base station.

In another aspect, in the method for measuring a channel quality indicator, the obtaining the channel quality indicator configuration from the base station, where the channel quality indicator configuration includes the first combination, includes:

obtaining at least one channel quality indicator configuration from the base station, where each channel quality indicator configuration of the at least one channel quality indicator configuration includes the one first combination;

the performing valid signal processing and interfering signal processing according to the valid signal processing manner and the interfering signal processing manner in the first combination to obtain a valid signal and an interfering signal includes performing valid signal processing and interfering signal processing according to the valid signal processing manner and the interfering signal processing manner included in the one first combination in each channel quality indicator configuration of the at least one channel quality indicator configuration to obtain one valid signal and one interfering signal corresponding to each channel quality indicator configuration of the at least one channel quality indicator configuration;

the performing channel quality indicator calculation according to the valid signal and the interfering signal to obtain a channel quality indicator includes:

performing channel quality indicator calculation according to one valid signal and one interfering signal corresponding to each channel quality indicator configuration of the at least one channel quality indicator configuration to obtain at least one channel quality indicator corresponding to the at least one channel quality indicator configuration; and the feeding the channel quality indicator back to a base station includes:

feeding the at least one channel quality indicator corresponding to the at least one channel quality indicator configuration back to the base station.

In still another aspect, in the method for measuring a channel quality indicator, the feeding, back to the base station, the channel quality indicator configuration used for calculating the channel quality indicator includes:

feeding, back to the base station, a bitmap used for indicating the channel quality indicator configuration, so that the base station determines, according to the channel quality indicator configuration included in the bitmap, the channel quality indicator configuration used for calculating the channel quality indicator; or feeding, back to the base station, a bitmap used for indicating the channel quality indicator configuration and an index number used for indicating the configuration used for calculating the channel quality indicator, so that the base station determines, according to the bitmap and the index number, the channel quality indicator configuration used for calculating the channel quality indicator; or feeding, back to the base station, an index number of the channel quality indicator configuration used for calculating the channel quality indicator, so that the base station determines, according to a bitmap used for calculating the channel quality indicator and set in the base station and the index number, the channel quality indicator configuration used for calculating the channel quality indicator.

In still another aspect, in the method for measuring a channel quality indicator, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

In still another aspect, in the method for measuring a channel quality indicator, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

In still another aspect, in the method for measuring a channel quality indicator, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the channel quality indicator is long-term statistical interference or instantaneous interference.

In a second aspect according to the present invention, a method for measuring a channel quality indicator is provided and includes:

determining a channel quality indicator configuration, where the channel quality indicator configuration includes a first combination, and the first combination includes a valid signal processing manner and an interfering signal processing manner;

indicating the channel quality indicator configuration to a user equipment, so that the user equipment performs valid signal processing and interfering signal processing according to the valid signal processing manner and the interfering signal processing manner in the first combination to obtain a valid signal and an interfering signal, and performs channel quality indicator calculation according to the valid signal and the interfering signal to obtain a channel quality indicator; and receiving the channel quality indicator fed back by the user equipment.

In one aspect, in the method for measuring a channel quality indicator, the determining a channel quality indicator configuration, where the channel quality indicator configuration includes a first combination, includes:

determining one channel quality indicator configuration, where the one channel quality indicator configuration includes at least one first combination;

the indicating the channel quality indicator configuration to a user equipment, so that the user equipment performs valid signal processing and interfering signal processing according to the valid signal processing manner and the interfering signal processing manner in the first combination to obtain a valid signal and an interfering signal, and performs channel quality indicator calculation according to the valid signal and the interfering signal to obtain a channel quality indicator, includes indicating the one channel quality indicator configuration to the user equipment, where the one channel quality indicator configuration includes at least one first combination, so that the user equipment performs valid signal processing and interfering signal processing according to a valid signal processing manner and an interfering signal processing manner of each first combination of the at least one first combination to obtain one valid signal and one interfering signal corresponding to each first combination of the at least one first combination, and performs channel quality indicator calculation according to the one valid signal and the one interfering signal corresponding to each first combination of the at least one first combination to obtain at least one channel quality indicator corresponding to the at least one first combination; and the receiving the channel quality indicator fed back by the user equipment includes:

receiving the at least one channel quality indicator corresponding to the at least one first combination and fed back by the user equipment.

In another aspect, in the method for measuring a channel quality indicator, the determining a channel quality indicator configuration, where the channel quality indicator configuration includes a first combination, includes:

determining at least one channel quality indicator configuration, where each channel quality indicator configuration of the at least one channel quality indicator configuration includes the one first combination;

the indicating the channel quality indicator configuration to a user equipment, so that the user equipment performs valid signal processing and interfering signal processing according to the valid signal processing manner and the interfering signal processing manner in the first combination to obtain a valid signal and an interfering signal, and performs channel quality indicator calculation according to the valid signal and the interfering signal to obtain a channel quality indicator, includes indicating the at least one channel quality indicator configuration to the user equipment, where each channel quality indicator configuration of the at least one channel quality indicator configuration includes the one first combination, so that the user equipment performs valid signal processing and interfering signal processing according to a valid signal processing manner and an interfering signal processing manner in the one first combination included in the each channel quality indicator configuration of the at least one channel quality indicator configuration to obtain one valid signal and one interfering signal corresponding to each channel quality indicator configuration of the at least one channel quality indicator configuration, and performs channel quality indicator calculation according to one valid signal and one interfering signal corresponding to each channel quality indicator configuration of the at least one channel quality indicator configuration to obtain at least one channel quality indicator corresponding to the at least one channel quality indicator configuration; and the receiving the channel quality indicator fed back by the user equipment includes:

receiving the at least one channel quality indicator corresponding to the at least one channel quality indicator configuration and fed back by the user equipment.

In still another aspect, in the method for measuring a channel quality indicator, the indicating the channel quality indicator configuration to a user equipment includes:

sending, to the user equipment, a bitmap used for indicating the channel quality indicator configuration, so that the user equipment determines, according to the channel quality indicator configuration included in the bitmap, the channel quality indicator configuration used for calculating the channel quality indicator; or sending, to the user equipment, a bitmap used for indicating the channel quality indicator configuration and an index number used for indicating the configuration used for calculating the channel quality indicator, so that the user equipment determines, according to the bitmap and the index number, the channel quality indicator configuration used for calculating the channel quality indicator; or sending, to the user equipment, an index number of the channel quality indicator configuration used for calculating the channel quality indicator, so that the user equipment determines, according to a bitmap used for calculating the channel quality indicator and set in the user equipment and the index number, the channel quality indicator configuration used for calculating the channel quality indicator.

In still another aspect, in the method for measuring a channel quality indicator, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

In still another aspect, in the method for measuring a channel quality indicator, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

In still another aspect, in the method for measuring a channel quality indicator, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the channel quality indicator is long-term statistical interference or instantaneous interference.

In a third aspect according to the present invention, a user equipment is provided and includes:

an obtaining module, configured to obtain a channel quality indicator configuration, where the channel quality indicator configuration includes a first combination, and the first combination includes a valid signal processing manner and an interfering signal processing manner;

a processing module, configured to perform valid signal processing and interfering signal processing according to the valid signal processing manner and the interfering signal processing manner in the first combination obtained by the obtaining module to obtain a valid signal and an interfering signal;

a calculating module, configured to perform channel quality indicator calculation according to the valid signal and the interfering signal obtained by the processing module to obtain a channel quality indicator; and a sending module, configured to feed the channel quality indicator obtained by the calculating module back to a base station.

In one aspect, in the user equipment, the obtaining module is specifically configured to obtain one channel quality indicator configuration from the base station, where the one channel quality indicator configuration includes at least one first combination;

the processing module is specifically configured to perform valid signal processing and interfering signal processing according to a valid signal processing manner and an interfering signal processing manner of each first combination of the at least one first combination to obtain one valid signal and one interfering signal corresponding to each first combination of the at least one first combination;

the calculating module is specifically configured to perform channel quality indicator calculation according to one valid signal and one interfering signal corresponding to each first combination of the at least one first combination to obtain at least one channel quality indicator corresponding to the at least one first combination; and the sending module is specifically configured to feed at least one channel quality indicator corresponding to the at least one first combination back to the base station.

In another aspect, in the user equipment, the obtaining module is specifically configured to obtain at least one channel quality indicator configuration from the base station, where each channel quality indicator configuration of the at least one channel quality indicator configuration includes the one first combination;

the processing module is specifically configured to perform valid signal processing and interfering signal processing according to the valid signal processing manner and the interfering signal processing manner included in the one first combination in each channel quality indicator configuration of the at least one channel quality indicator configuration to obtain one valid signal and one interfering signal corresponding to each channel quality indicator configuration of the at least one channel quality indicator configuration;

the calculating module is specifically configured to perform channel quality indicator calculation according to one valid signal and one interfering signal corresponding to each channel quality indicator configuration of the at least one channel quality indicator configuration to obtain at least one channel quality indicator corresponding to the at least one channel quality indicator configuration; and the sending module is specifically configured to feed the at least one channel quality indicator corresponding to the at least one channel quality indicator configuration back to the base station.

In still another aspect, in the user equipment, the obtaining module is specifically configured to: obtain, from the base station, a bitmap used for indicating the channel quality indicator configuration, and determine, according to the channel quality indicator configuration included in the bitmap, the channel quality indicator configuration used for calculating the channel quality indicator; or obtain, from the base station, a bitmap used for indicating the channel quality indicator configuration and an index number used for indicating the configuration used for calculating the channel quality indicator, and determine, according to the bitmap and the index number, the channel quality indicator configuration used for calculating the channel quality indicator; or obtain, from the base station, an index number of the channel quality indicator configuration used for calculating the channel quality indicator, and determine, according to a bitmap used for calculating the channel quality indicator and set in the user equipment and the index number, the channel quality indicator configuration used for calculating the channel quality indicator.

In still another aspect, in the user equipment, the sending module is specifically configured to: feed, back to the base station, a bitmap used for indicating the channel quality indicator configuration, so that the base station determines, according to the channel quality indicator configuration included in the bitmap, the channel quality indicator configuration used for calculating the channel quality indicator; or feed, back to the base station, a bitmap used for indicating the channel quality indicator configuration and an index number used for indicating the configuration used for calculating the channel quality indicator, so that the base station determines, according to the bitmap and the index number, the channel quality indicator configuration used for calculating the channel quality indicator; or feed, back to the base station, an index number of the channel quality indicator configuration used for calculating the channel quality indicator, so that the base station determines, according to a bitmap used for calculating the channel quality indicator and set in the base station and the index number, the channel quality indicator configuration used for calculating the channel quality indicator.

In still another aspect, in the user equipment, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

In still another aspect, in the user equipment, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

In still another aspect, in the user equipment, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the channel quality indicator is long-term statistical interference or instantaneous interference.

In a fourth aspect according to the present invention, a base station is provided and includes:

a determining module, configured to determine a channel quality indicator configuration, where the channel quality indicator configuration includes a first combination, and the first combination includes a valid signal processing manner and an interfering signal processing manner;

an indicating module, configured to indicate the channel quality indicator configuration determined by the determining module to a user equipment, so that the user equipment performs valid signal processing and interfering signal processing according to the valid signal processing manner and the interfering signal processing manner in the first combination to obtain a valid signal and an interfering signal, and performs channel quality indicator calculation according to the valid signal and the interfering signal to obtain a channel quality indicator; and a receiving module, configured to receive the channel quality indicator fed back by the user equipment.

In one aspect, in the base station, the determining module is specifically configured to determine one channel quality indicator configuration, where the one channel quality indicator configuration includes at least one first combination;

the indicating module is specifically configured to indicate the one channel quality indicator configuration to the user equipment, where the one channel quality indicator configuration includes at least one first combination, so that the user equipment performs valid signal processing and interfering signal processing according to a valid signal processing manner and an interfering signal processing manner of each first combination of the at least one first combination to obtain one valid signal and one interfering signal corresponding to each first combination of the at least one first combination, and performs channel quality indicator calculation according to the one valid signal and the one interfering signal corresponding to each first combination of the at least one first combination to obtain at least one channel quality indicator corresponding to the at least one first combination; and the receiving module is specifically configured to receive the at least one channel quality indicator corresponding to the at least one first combination and fed back by the user equipment.

In another aspect, in the base station, the determining module is specifically configured to determine at least one channel quality indicator configuration, where each channel quality indicator configuration of the at least one channel quality indicator configuration includes the one first combination;

the indicating module is specifically configured to indicate the at least one channel quality indicator configuration to the user equipment, where each channel quality indicator configuration of the at least one channel quality indicator configuration includes the one first combination, so that the user equipment performs valid signal processing and interfering signal processing according to a valid signal processing manner and an interfering signal processing manner in the one first combination included in the each channel quality indicator configuration of the at least one channel quality indicator configuration to obtain one valid signal and one interfering signal corresponding to each channel quality indicator configuration of the at least one channel quality indicator configuration, and performs channel quality indicator calculation according to one valid signal and one interfering signal corresponding to each channel quality indicator configuration of the at least one channel quality indicator configuration to obtain at least one channel quality indicator corresponding to the at least one channel quality indicator configuration; and the receiving module is specifically configured to receive the at least one channel quality indicator corresponding to the at least one channel quality indicator configuration and fed back by the user equipment.

In still another aspect, in the base station, the indicating module is specifically configured to: send, to the user equipment, a bitmap used for indicating the channel quality indicator configuration, so that the user equipment determines, according to the channel quality indicator configuration included in the bitmap, the channel quality indicator configuration used for calculating the channel quality indicator; or send, to the user equipment, a bitmap used for indicating the channel quality indicator configuration and an index number used for indicating the configuration used for calculating the channel quality indicator, so that the user equipment determines, according to the bitmap and the index number, the channel quality indicator configuration used for calculating the channel quality indicator; or send, to the user equipment, an index number of the channel quality indicator configuration used for calculating the channel quality indicator, so that the user equipment determines, according to a bitmap used for calculating the channel quality indicator and set in the user equipment and the index number, the channel quality indicator configuration used for calculating the channel quality indicator.

In still another aspect, in the base station, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

In still another aspect, in the base station, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding is at the time of using joint precoding processing.

In still another aspect, in the base station, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the channel quality indicator is long-term statistical interference or instantaneous interference.

In a fifth aspect according to the present invention, a system for measuring a CQI is provided and includes: a base station and a user equipment, where the base station is configured to determine a channel quality indicator configuration, where the channel quality indicator configuration includes a first combination, and the first combination includes a valid signal processing manner and an interfering signal processing manner; and indicate the determined channel quality indicator configuration to the user equipment;

the user equipment is configured to obtain the channel quality indicator configuration indicated by the base station, perform valid signal processing and interfering signal processing according to the valid signal processing manner and the interfering signal processing manner in the first combination to obtain a valid signal and an interfering signal, and performs channel quality indicator calculation according to the valid signal and the interfering signal obtained by a processing module to obtain a channel quality indicator; feed the channel quality indicator obtained by a calculating module back to the base station; perform channel quality indicator calculation according to the valid signal and the interfering signal obtained by the processing module to obtain a channel quality indicator; and feed the obtained channel quality indicator back to the base station; and the base station is further configured to receive the channel quality indicator fed back by the user equipment.

In a sixth aspect according to the present invention, a system for measuring a CQI is provided and includes: a base station and a user equipment, where the user equipment is configured to obtain a channel quality indicator configuration set in the user equipment, where the channel quality indicator configuration includes a first combination, and the first combination includes a valid signal processing manner and an interfering signal processing manner; perform valid signal processing and interfering signal processing according to the valid signal processing manner and the interfering signal processing manner in the first combination to obtain a valid signal and an interfering signal; perform channel quality indicator calculation according to the valid signal and the interfering signal obtained by a processing module to obtain a channel quality indicator; and feed the channel quality indicator and the channel quality indicator configuration obtained by a calculating module back to the base station; and the base station is further configured to receive the channel quality indicator and the channel quality indicator configuration fed back by the user equipment.

In the method and the system for measuring a channel quality indicator, the user equipment and the base station of the present invention, a channel quality indicator configuration is obtained, where the channel quality indicator configuration includes a first combination, and the first combination includes a valid signal processing manner and an interfering signal processing manner; valid signal processing and interfering signal processing are performed according to the valid signal processing manner and the interfering signal processing manner in the first combination to obtain a valid signal and an interfering signal; channel quality indicator calculation is performed according to the valid signal and the interfering signal to obtain a channel quality indicator; and the channel quality indicator is fed back to the base station. Technical solutions of the embodiments of the present invention can be applied to a multi-node collaboration system, so as to solve a defect of the prior art that channel quality indicator measurement cannot be applied to a multi-node collaboration system, and can provide an effective channel quality indicator measurement solution for the multi-node collaboration system.

BRIEF DESCRIPTION OF DRAWINGS

To describe the technical solutions in the embodiments of the present invention more clearly, the following briefly introduces accompanying drawings required for describing the embodiments Apparently, the accompanying drawings in the following description show some embodiments of the present invention, and persons of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiment of the present invention without creative efforts shall fall within the protection scope of the present invention.

Figure 1:
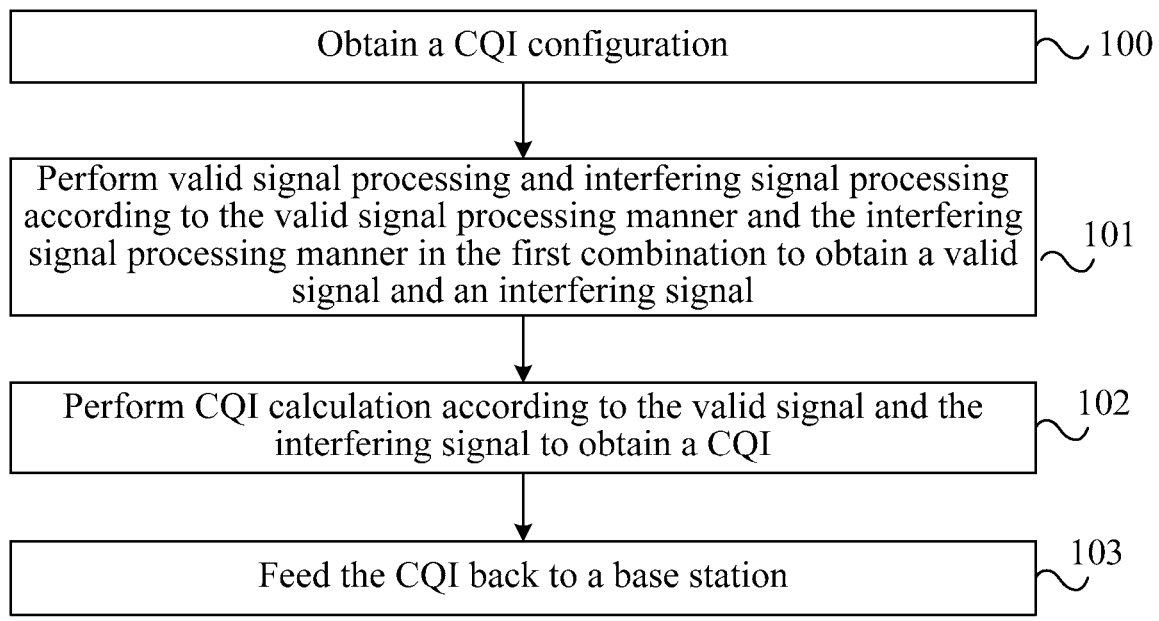
FIG. 1 is a flow chart of a method for measuring a CQI according to an embodiment of the present invention.

FIG. 1 is a flow chart of a method for measuring a CQI according to an embodiment of the present invention. As shown in FIG. 1, the execution body of the method for measuring a CQI of this embodiment is a UE (User Equipment; UE for short), and the method for measuring a CQI of this embodiment may specifically include the following steps.

100: Obtain a CQI configuration.

The CQI configuration includes a first combination, and the first combination includes a valid signal processing manner and an interference processing manner.

101: Perform valid signal processing and interfering signal processing according to the valid signal processing manner and the interfering signal processing manner in the first combination to obtain a valid signal and an interfering signal.

102: Perform CQI calculation according to the valid signal and the interfering signal to obtain a CQI.

103: Feed the CQI back to a base station.

The method for measuring a CQI of this embodiment may be applied to a multi-node collaboration system.

In the method for measuring a CQI of this embodiment, a CQI configuration is obtained, where the CQI configuration includes a first combination, and the first combination includes a valid signal processing manner and an interfering signal processing manner; valid signal processing and interfering signal processing are performed according to the valid signal processing manner and the interfering signal processing manner in the first combination to obtain a valid signal and an interfering signal; CQI calculation is performed according to the valid signal and the interfering signal to obtain a CQI; and the CQI is fed back to a base station. The technical solutions of the embodiments of the present invention can be applied to a multi-node collaboration system, so as to solve a defect of the prior art that CQI measurement cannot be applied to a multi-node collaboration system, and can provide an effective CQI measurement solution to the multi-node collaboration system.

Optionally, on a basis of the technical solution of the embodiment, the obtaining a CQI configuration in step 100 may specifically be that a UE obtains a CQI configuration from a base station, or may further be that a UE sets a CQI configuration in the UE, namely, the UE itself predefines a CQI configuration, or the UE may further use a default CQI configuration.

Further optionally, when a UE obtains a CQI configuration from a base station, the CQI configuration further includes a first combination, and the first combination includes a valid signal processing manner and an interfering signal processing manner. Use of an air interface resource is increased when all CQI configurations are transmitted through an air interface between the base station and the UE. In order to reduce the use of the air interface resource, a corresponding identifier such as sequence number may be set for each first combination between the base station and the UE, and the identifier of the first combination may only be carried in a CQI configuration message, so that the air interface resources may be effectively reduced.

Optionally, when a UE obtains a CQI configuration from a base station, it may be specifically that the UE receives higher-layer signaling carrying a CQI configuration and sent by the base station, and the higher-layer signaling may be radio resource control (Radio Resource Control; RRC for short) signaling. That is to say, the CQI configuration may be carried in the higher-layer signaling and sent to the UE.

The valid signal processing manner and the interfering signal processing manner include: measuring a reference signal to obtain a valid signal and an interfering signal, where the reference signal may be a cell-specific reference signal CRS or may also be a channel state information-reference signal CSI-RS, or may also include: measuring a channel such as a packet dedicated control channel (Packet Dedicated Control Channel; PDCCH for short) to obtain a valid signal and an interfering signal.

In an LTE communication system, the PDCCH may be a physical downlink control channel (Physical Downlink Control Channel).

Figure 2:
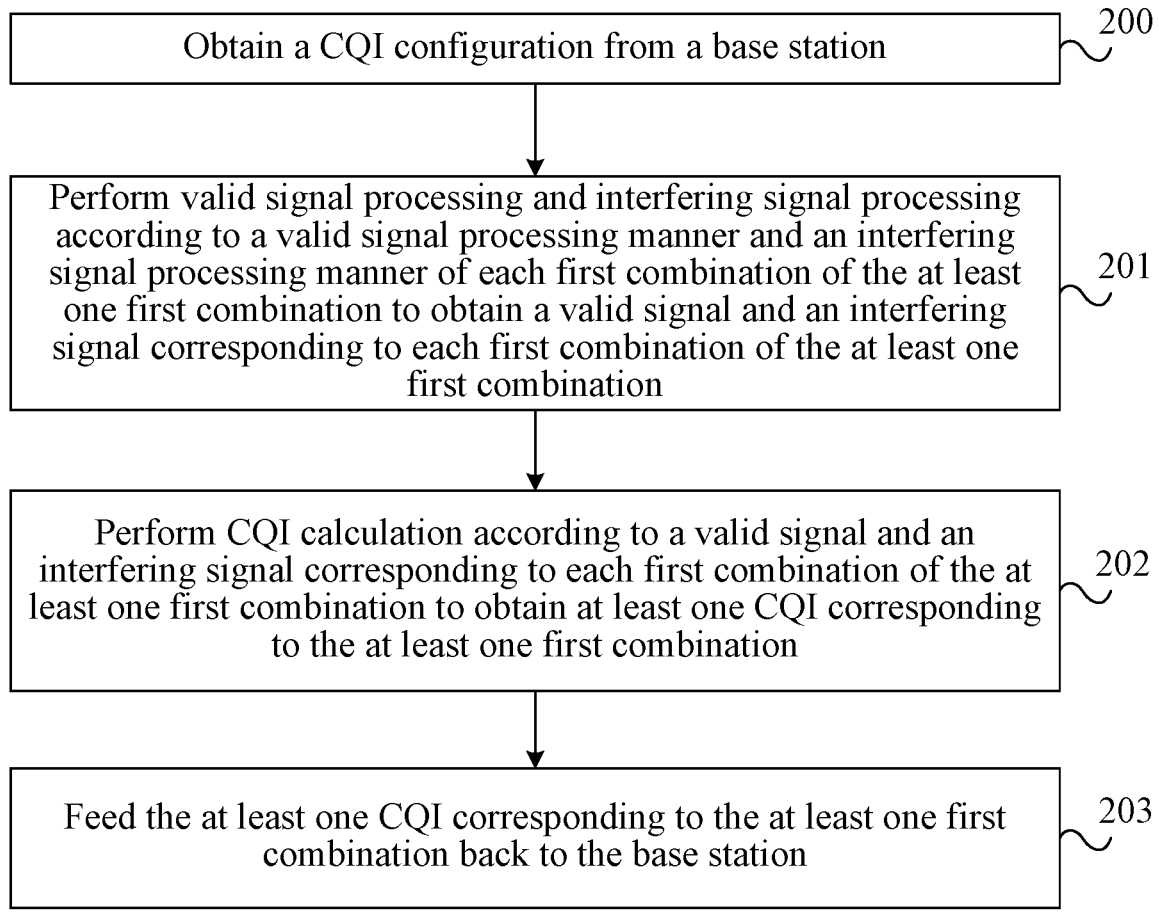
FIG. 2 is a flow chart of a method for measuring a CQI according to another embodiment of the present invention.

FIG. 2 is a flow chart of a method for measuring a CQI according to another embodiment of the present invention. The execution body of the method for measuring a CQI of this embodiment is still a UE. As shown in FIG. 2, in the method for measuring a CQI of this embodiment, the technical solution of the present invention is further introduced in more detail on a basis of the embodiment shown in FIG. 1. As shown in FIG. 2, the method for measuring a CQI of this embodiment may specifically include the following steps.

200: Obtain a CQI configuration from a base station.

In this embodiment, the technical solution of the present invention is introduced by taking that a CQI configuration is obtained from a base station as an example. Specifically, in this embodiment, the CQI configuration includes at least one first combination; each first combination includes a signal processing manner and an interference processing manner.

201: Perform valid signal processing and interfering signal processing according to a valid signal processing manner and an interfering signal processing manner of each first combination of the at least one first combination to obtain one valid signal and one interfering signal corresponding to each first combination of the at least one first combination.

202: Perform CQI calculation according to the one valid signal and the one interfering signal corresponding to each first combination of the at least one first combination to obtain at least one CQI corresponding to the at least one first combination.

203: Feed the at least one CQI corresponding to the at least one first combination back to the base station.

In this embodiment, each first combination, one valid signal and one interfering signal corresponding to the first combination, and one CQI corresponding to the first combination are in one-to-one correspondence.

Specifically, 200 to 203 in this embodiment are specifically a procedure of detailing step 100 to step 103 in the embodiment shown in FIG. 1.

The method for measuring a CQI of this embodiment may at least be applied to a scenario in which dynamic node selecting or dynamic node silence is used as a collaboration method in a multi-node collaboration system.

In the method for measuring a CQI of this embodiment, a CQI configuration is obtained from a base station; valid signal processing and interfering signal processing are performed according to a valid signal processing manner and an interfering signal processing manner of each first combination of at least one first combination to obtain one valid signal and one interfering signal corresponding to each first combination of the at least one first combination; CQI calculation is performed according to the one valid signal and the one interfering signal corresponding to each first combination of the at least one first combination to obtain at least one CQI corresponding to the at least one first combination; the at least one CQI corresponding to the at least one first combination is fed back to the base station. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

Figure 3:
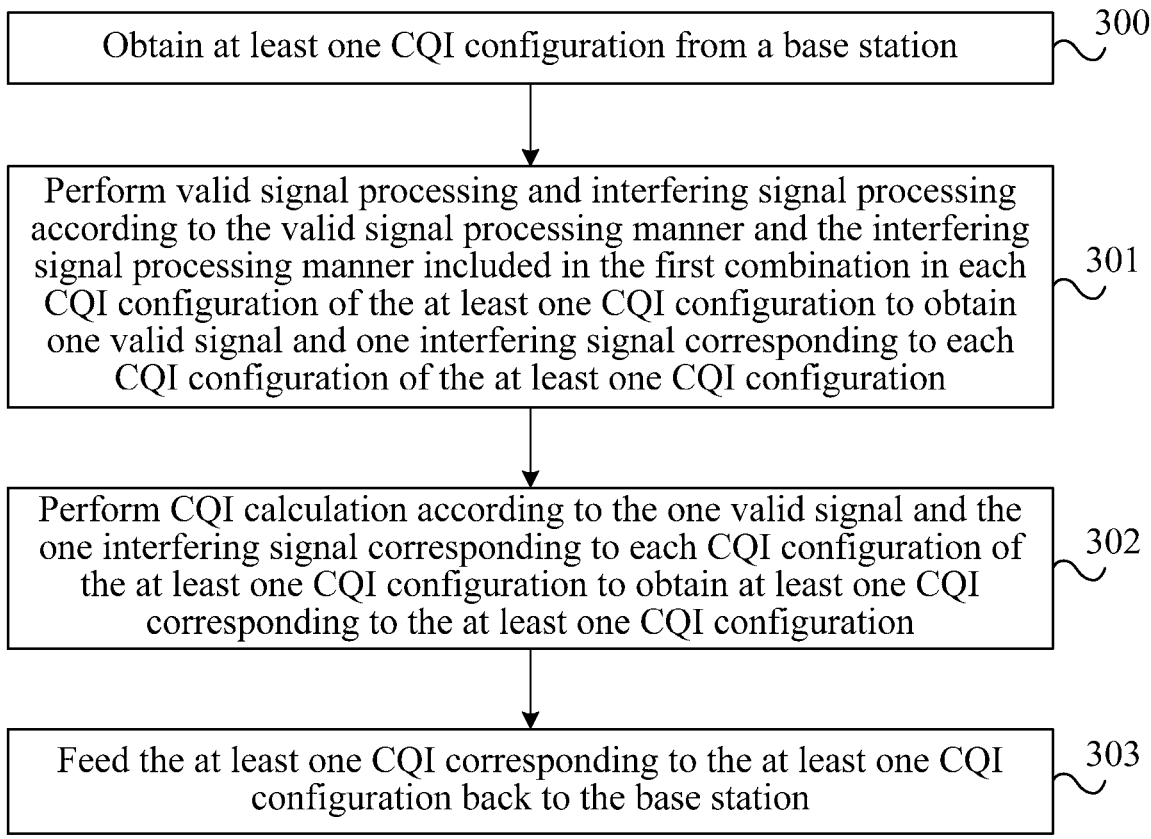
FIG. 3 is a flow chart of a method for measuring a CQI according to still another embodiment of the present invention.

FIG. 3 is a flow chart of a method for measuring a CQI according to still another embodiment of the present invention. The execution body of the method for measuring a CQI of this embodiment is still a UE. As shown in FIG. 3, in the method for measuring a CQI of this embodiment, the technical solution of the present invention is further introduced in more detail on a basis of the embodiment shown in FIG. 1. As shown in FIG. 3, the method for measuring a CQI of this embodiment may specifically include the following steps.

300: Obtain at least one CQI configuration from a base station.

In this embodiment, the technical solution of the present invention is introduced by taking that a CQI configuration is obtained from a base station as an example. Specifically, in this embodiment, a UE obtains at least one CQI configuration from a base station, where each CQI configuration includes a first combination; each combination of a signal processing manner and an interference processing manner includes a signal processing manner and an interference processing manner.

301: Perform valid signal processing and interfering signal processing according to the valid signal processing manner and the interfering signal processing manner included in the first combination in each CQI configuration of the at least one CQI configuration to obtain one valid signal and one interfering signal corresponding to each CQI configuration of the at least one CQI configuration.

302: Perform CQI calculation according to the one valid signal and the one interfering signal corresponding to each CQI configuration of the at least one CQI configuration to obtain at least one CQI corresponding to the at least one CQI configuration.

303: Feed the at least one CQI corresponding to the at least one CQI configuration back to the base station.

In this embodiment, each CQI configuration, one first combination corresponding to the CQI configuration, and one CQI corresponding to the CQI configuration are in one-to-one correspondence.

Specifically, 300 to 303 in this embodiment are specifically a procedure of detailing step 100 to step 103 in the embodiment shown in FIG. 1.

The method for measuring a CQI of this embodiment may at least be applied to a scenario in which various different multi-node collaboration technologies are used as collaboration methods in a multi-node collaboration system, and each collaboration method corresponds to one type of CQI configuration. For example, the base station, during scheduling, may select and use one of joint transmission/collaboration scheduling/dynamic node as a manner for the UE to transmit data, so the UE needs to calculate a CQI corresponding to the collaboration method of joint transmission/collaboration scheduling/dynamic node and feed the CQI back to the base station, and therefore the base station selects a collaboration method to schedule the UE. Also the base station may further implement switching among various collaboration methods.

In the method for measuring a CQI of this embodiment, at least one CQI configuration is obtained from a base station; valid signal processing and interfering signal processing are performed according to the valid signal processing manner and the interfering signal processing manner included in the first combination in each CQI configuration of the at least one CQI configuration to obtain one valid signal and one interfering signal corresponding to each CQI configuration of the at least one CQI configuration; CQI calculation is performed according to the one valid signal and the one interfering signal corresponding to each CQI configuration of the at least one CQI configuration to obtain at least one CQI corresponding to the at least one CQI configuration; the at least one CQI corresponding to the at least one CQI configuration is fed back to the base station. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

In the embodiments shown in FIG. 1, FIG. 2 and FIG. 3, in step 100, step 200 or step 300, that a UE obtains a CQI configuration from a base station may specifically further include the following steps.

(1) Obtain, from the base station, a bitmap (Bitmap) used for indicating the CQI configuration, and determine, according to the CQI configuration included in the bitmap, the CQI configuration used for calculating the CQI; or For example, in step 200, when a CQI configuration is obtained from a base station, a bitmap corresponding to the CQI configuration may be obtained. Correspondingly, the bitmap may be one-dimensional. For example, the bitmap may indicate a first combination. For example, the bitmap may indicate whether resources in the CQI configuration are correspondingly applied to signal measurement processing or interference measurement processing, and different processing methods. Correspondingly, the bitmap may also be two-dimensional. For example, the bitmap may indicate information of at least two first combinations or at least two CQI configurations.

Optionally, for example, in 300, when at least one CQI configuration is obtained from a base station, each CQI configuration only includes one first combination. When a CQI configuration is obtained from the base station, the correspondingly obtained bitmap may be one-dimensional. When at least two CQI configurations are obtained from the base station, the correspondingly obtained bitmap is two-dimensional, and each row may denote a CQI configuration. The bitmap may be further used to denote one predefined CQI configuration or some predefined CQI configurations according to which the UE is required to perform CQI measurement.

(2) Obtain, from the base station, a bitmap used for indicating the CQI configuration and an index number used for indicating a configuration used for calculating the CQI, and determine, according to the bitmap and the index number, a CQI configuration used for calculating the CQI; or (3) Obtain, from the base station, an index number of a CQI configuration used for calculating a CQI, and determine, according to a bitmap used for calculating a CQI and set in a UE and the index number, a CQI configuration used for calculating the CQI.

In order to effectively save an air interface resource, an index number corresponding to a CQI configuration used for calculating a CQI may be defined between the base station and the UE. During use, the base station may only indicate an index number corresponding to a CQI configuration to the UE, so that the UE may determine a corresponding CQI configuration according to the index number corresponding to the CQI configuration, and therefore the air interface resource can be effectively saved.

Here, the description on the bitmap and the index number indicating the configuration used for calculating the CQI is only an example and during actual use, the bitmap and the index number may be used to indicate any indication information in the present invention, such as a CQI configuration and all corresponding information.

At first, it should be noted that, the valid signal processing manner in the first combination in the CQI configuration includes at least one of the following items: indication information used for indicating a resource bearing a valid signal, where the valid signal is obtained by measuring the resource bearing a valid signal; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

The precoding processing manner of performing precoding processing on a signal includes: a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

Further optionally, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes: a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the CQI is long-term statistical interference or instantaneous interference.

A default CQI configuration may be set between the base station and the UE and a default first combination may be further set between the base station and the UE; when the base station does not explicitly indicate a first combination, the UE may consider by default that the base station uses a default or predefined first combination.

In one embodiment, a resource bearing an interfering signal may be a reference signal, and the interfering signal measurement manner may be to measure directly interference information of the reference signal; the resource bearing an interfering signal may be channel information, such as PDCCH, and the interfering signal measurement manner may be to measure interference information on a time-frequency resource bearing the channel information. Precoding and/or power adjustment may be further performed on the interference information.

The bitmap (Bitmap) used in the embodiment is used for reflecting the interference processing manner and the signal processing manner in a combination of the interference processing manner and the signal processing manner. One two-dimensional bitmap table is shown in Table 1, in which each row denotes one CQI configuration, or information in Table 1 may also be denoted by using a plurality of one-dimensional bitmaps. That the CQI configuration in the Table 1 only includes a combination of a signal processing manner and an interference processing manner is taken as an example. When one CQI configuration includes a plurality of combinations of a signal processing manner and an interference processing manner, each combination of a signal processing manner and an interference processing manner may be further divided, and details are not repeatedly described herein.

TABLE 1

| CQI configuration | Resource 1 | Resource 2 | Resource 3 | Resource 4 | Corresponding transmission method |
|---|---|---|---|---|---|
| CQI configuration 1 | Valid signal | Interference obtaining manner 1 | Interference obtaining manner 2 | Interference obtaining manner 2 | Single-node transmission |

TABLE 1-continued

| CQI configuration | Resource 1 | Resource 2 | Resource 3 | Resource 4 | Corresponding transmission method |
|---|---|---|---|---|---|
| CQI configuration 2 | Valid signal | Valid signal | Interference obtaining manner 1 | No indication | Joint transmission: jointly process a signal |
| CQI configuration 3 | Valid signal | Valid signal | Interference obtaining manner 1 | Valid signal | Joint transmission: jointly process a signal |
| CQI configuration 4 | Valid signal | Interference obtaining manner 1 | Interference obtaining manner 2: generate an emission weight according to interference coordination | Interference obtaining manner 2 | Interference coordination and single-node transmission |
| CQI configuration 5 | Valid signal | Interference obtaining manner 1 | Interference obtaining manner 2 | Interference obtaining manner 2 | Dynamic node selection |
| CQI configuration 6 | Interference obtaining manner 2 | Interference obtaining manner 1 | Valid signal | Interference obtaining manner 2 | Dynamic node selection |
| CQI configuration 7 | Interference obtaining manner 2 | Interference obtaining manner 1 | Interference obtaining manner 2 | Valid signal | Dynamic node selection |
| CQI configuration 8 | Valid signal | Interference obtaining manner 1 | Silence | Interference obtaining manner 2 | Dynamic node silence |
| CQI configuration 9 | Silence | Interference obtaining manner 1 | Valid signal | Interference obtaining manner 2 | Dynamic node silence |
| CQI configuration 10 | Silence | Interference obtaining manner 1 | Interference obtaining manner 2 | Valid signal | Dynamic node silence |

The interference obtaining manner 1 may be to measure an interfering signal directly on the resource used for bearing the interfering signal, and may specifically be to obtain the interfering signal by measuring the reference signal.

The interference obtaining manner 2 may be to measure interference generated by one or more nodes according to a resource bearing a channel of one or more nodes, and may be specifically to obtain an interfering signal by measuring the channel.

Or, one two-dimensional bitmap table is shown in Table 2, in which each row denotes one CQI configuration. That the CQI configuration in the Table 2 only includes a combination of a signal processing manner and an interference processing manner is taken as an example. When one CQI configuration includes a plurality of combinations of a signal processing manner and an interference processing manner, each combination of a signal processing manner and an interference processing manner may be further divided, and details are not repeatedly described herein. RSRP in the table denotes reference signal receiving power (Reference Signal Receiving Power; RSRP for short), and CoMP denotes coordinated multi-point transmission/reception (Coordinated Multi-Point transmission/reception; CoMP for short).

The information in Table 2 may also be denoted by using a plurality of one-dimensional bitmaps.

TABLE 2

| CQI configuration | Resource 1 | Resource 2 | Resource 3 | Resource 4 | Resource 5 | Corresponding transmission method, and combination of signal processing manner and interference combination manner |
|---|---|---|---|---|---|---|
| CQI configuration 1 | Valid signal | Blank/silence | Blank/silence | Blank/silence | Interference obtaining manner 1 (interference out of collaboration node set) | Dynamic node selection/dynamic node silence (combination 1) |
| CQI configuration 2 | Blank/silence | Valid signal | Blank/silence | Blank/silence | | Dynamic node selection/dynamic node silence (combination 2) |

TABLE 2-continued

| CQI configuration | Resource 1 | Resource 2 | Resource 3 | Resource 4 | Resource 5 | Corresponding transmission method, and combination of signal processing manner and interference combination manner |
|---|---|---|---|---|---|---|
| CQI configuration 3 | Blank/silence | Blank/silence | Valid signal | Blank/silence | | Dynamic node selection/dynamic node silence (combination 3) |
| CQI configuration 4 | Blank/silence | Blank/silence | Blank/silence | Valid signal | | Dynamic node selection/dynamic node silence (combination 4) |
| CQI configuration 5 | Valid signal | Interfering signal (codebook-based) | Interfering signal (codebook-based) | Interfering signal (codebook-based) | | Coordination scheduling/coordination beam forming, and single-node transmission |
| CQI configuration 6 | Valid signal | Valid signal | Valid signal | Valid signal | | Joint transmission (combination 1) |
| CQI configuration 7 | Valid signal | Valid signal | Interfering signal (RSRP3) | Interfering signal (RSRP4) | | Joint transmission (combination 2) |
| CQI configuration 8 | Interfering signal (RSRP1) | Valid signal | Interfering signal (RSRP3) | Interfering signal (RSRP4) | | Dynamic node selection (combination 1) |
| CQI configuration 9 | Valid signal | Interfering signal (RSRP2) | Interfering signal (RSRP3) | Interfering signal (RSRP4) | | Dynamic node selection (combination 2) |
| CQI configuration 10 | Valid signal | Valid signal | Blank/silence | Interfering signal (codebook-based) | | Various CoMP manner combinations, such as joint transmission + dynamic node selection + dynamic node silence + coordination scheduling/coordination beam forming |

The interference obtaining manner 1 may be to measure an interfering signal directly on the resource used for bearing the interfering signal, and may specifically be to obtain the interfering signal by measuring the reference signal.

The interference obtaining manner 2 may be to measure interference generated by one or more nodes according to a resource bearing a channel of one or more nodes, and may be specifically to obtain an interfering signal by measuring the channel.

It should be noted that, in both 200 and 300 in the embodiments shown in FIG. 2 and FIG. 3, that a UE obtains a CQI configuration message from a base station is taken as an example. In 100 in the embodiment shown in FIG. 1, the UE may also set a CQI configuration in the UE, namely, the UE itself predefines a CQI configuration. Specifically, the UE may define a first combination in the CQI configuration. Specifically, step 200 in the embodiment may be replaced with "a UE sets a CQI configuration in the UE, where the CQI configuration may include at least one first combination", or step 300 in the embodiment may also be replaced with "a UE sets at least one CQI configuration in the UE, where each CQI configuration may include one first combination"; for the rest, reference may be made to the record of step 201 to step 203 in the embodiment shown in FIG. 2, or reference may be made to the record of step 301 to step 303 in the embodiment shown in FIG. 3, and details are not repeatedly described herein.

When the UE predefines a CQI configuration, the base station does not know the type of CQI configuration for which the CQI fed back by the UE in step 103 of the embodiment is calculated, so after setting a CQI configuration in the UE, the UE needs to feed the CQI configuration back to the base station, so as to inform the base station that the CQI is calculated based on the CQI configuration. Specifically, the CQI configuration used for calculating the CQI may be fed back to the base station before 103 or after 103.

Further, for a form in which the UE feeds a CQI configuration back to the base station, reference may be made to a form in which the UE obtains a CQI configuration from the base station involved in the embodiment, or various forms may also be included; for example, the following several forms may be included:

(a) A UE feeds, back to a base station, a bitmap used for indicating the CQI configuration, so that the base station determines, according to a CQI configuration included in the bitmap, a CQI configuration used for calculating the CQI; or (b) A UE feeds, back to a base station, a bitmap used for indicating the CQI configuration and an index number used for indicating a configuration used for calculating the CQI, so that the base station determines, according to the bitmap and the index number, a CQI configuration used for calculating the CQI; or (c) A UE feeds, back to a base station, an index number of a CQI configuration used for calculating a CQI, so that the base station determines, according to a bitmap used for calculating a CQI and set in the base station and the index number, a CQI configuration used for calculating the CQI.

For details, reference may be made to the record of the manner in which the UE obtains a CQI configuration from the base station, and details are not repeatedly described herein.

Figure 4:
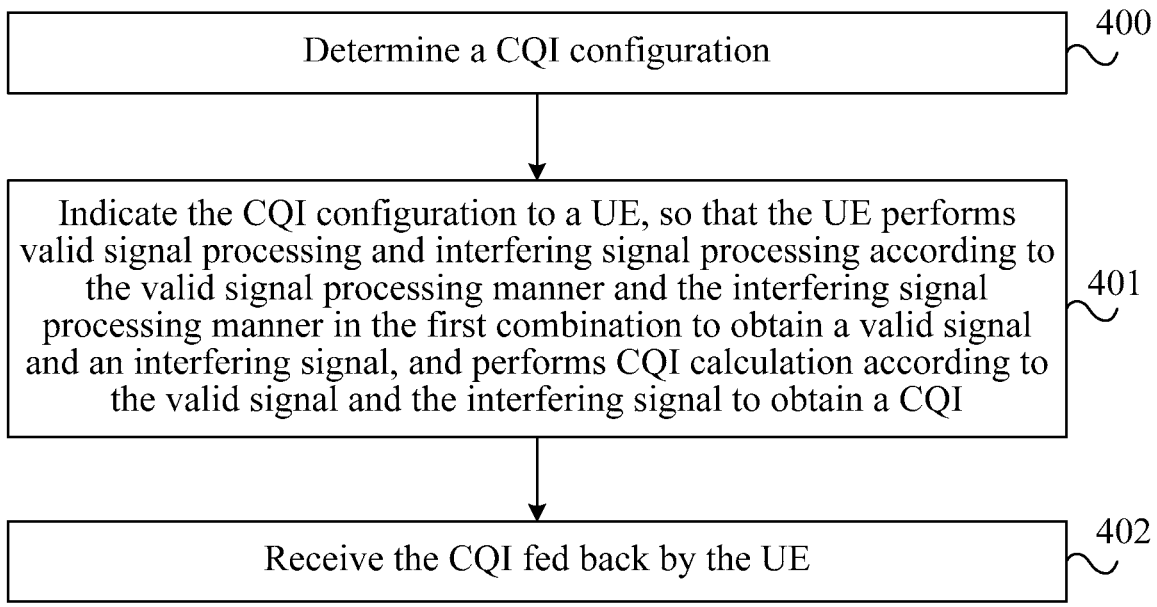
FIG. 4 is a flow chart of a method for measuring a CQI according to yet another embodiment of the present invention.

FIG. 4 is a flow chart of a method for measuring a CQI according to yet another embodiment of the present invention. As shown in FIG. 4, the execution body of the method for measuring a CQI of this embodiment is a base station, and the method for measuring a CQI of this embodiment may specifically include the following steps.

400: Determine a CQI configuration.

In this embodiment, the CQI configuration includes a first combination, and the first combination includes a valid signal processing manner and an interfering signal processing manner.

401: Indicate the CQI configuration to a UE, so that the UE performs valid signal processing and interfering signal processing according to the valid signal processing manner and the interfering signal processing manner in the first combination to obtain a valid signal and an interfering signal, and performs CQI calculation according to the valid signal and the interfering signal to obtain a CQI.

402: Receive the CQI fed back by the UE.

In the method for measuring a CQI of this embodiment, the technical solution of the embodiment of the present invention is described at a side of the base station. The difference between this embodiment and the embodiment shown in FIG. 1 only lies in that: in this embodiment, it is explicit that a base station indicates a CQI configuration to a UE and the technical solution of the present invention is described at the base station side, and for the rest implementation process, reference may be also made to the relevant record of the foregoing embodiment.

The method for measuring a CQI of this embodiment may be applied to a multi-node collaboration system.

In the method for measuring a CQI of this embodiment, a base station determines a CQI configuration; indicates the CQI configuration to a UE, so that the UE performs valid signal processing and interfering signal processing according to the valid signal processing manner and the interfering signal processing manner in the first combination to obtain a valid signal and an interfering signal, and performs CQI calculation according to the valid signal and the interfering signal to obtain a CQI; and receives the CQI fed back by the UE. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

Figure 5:
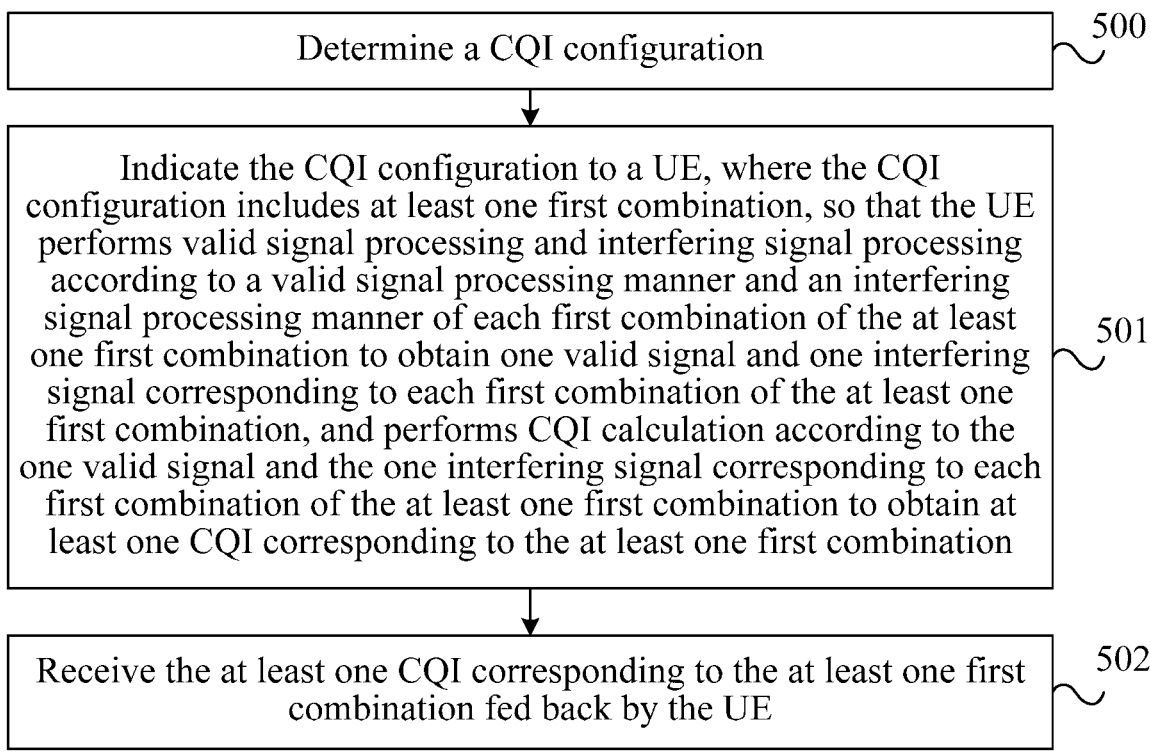
FIG. 5 is a flow chart of a method for measuring a CQI according to yet another embodiment of the present invention.

FIG. 5 is a flow chart of a method for measuring a CQI according to yet another embodiment of the present invention. The execution body of the method for measuring a CQI of this embodiment is still a base station. As shown in FIG. 5, in the method for measuring a CQI of this embodiment, the technical solution of the present invention is further introduced in more detail on a basis of the embodiment shown in FIG. 4. As shown in FIG. 5, the method for measuring a CQI of this embodiment may specifically include the following steps.

500: Determine a CQI configuration.

In this embodiment, the CQI configuration includes at least one first combination.

501: Indicate the CQI configuration to a UE, where the CQI configuration includes at least one first combination, so that the UE performs valid signal processing and interfering signal processing according to a valid signal processing manner and an interfering signal processing manner of each first combination of the at least one first combination to obtain one valid signal and one interfering signal corresponding to each first combination of the at least one first combination, and performs CQI calculation according to the one valid signal and the one interfering signal corresponding to each first combination of the at least one first combination to obtain at least one CQI corresponding to the at least one first combination.

In this embodiment, each first combination and a CQI corresponding to the first combination are in one-to-one correspondence.

502: Receive the at least one CQI corresponding to the at least one first combination fed back by the UE.

Specifically, 500 to 502 in this embodiment are specifically a procedure of detailing step 400 to step 402 in the embodiment shown in FIG. 4. Also, the difference between the technical solution of this embodiment and the technical solution of the embodiment shown in FIG. 2 only lies in that: in the embodiment shown in FIG. 2, the technical solution of the embodiment of the present invention is described at the UE side, while in this embodiment, the technical solution of the embodiment of the present invention is described at the base station side; for details, reference may also be made to the record of the embodiment shown in FIG. 2, and details are not repeatedly described herein.

The method for measuring a CQI of this embodiment may at least be applied to a scenario in which dynamic node selecting or dynamic node silence is used as a collaboration method in a multi-node collaboration system.

In the method for measuring a CQI of this embodiment, a base station determines a CQI configuration; indicates the CQI configuration to a UE, where the CQI configuration includes at least one first combination, so that the UE performs valid signal processing and interfering signal processing according to a valid signal processing manner and an interfering signal processing manner of each first combination of the at least one first combination to obtain one valid signal and one interfering signal corresponding to each first combination of the at least one first combination, and performs CQI calculation according to the one valid signal and the one interfering signal corresponding to each first combination of the at least one first combination to obtain at least one CQI corresponding to the at least one first combination; and receives the at least one CQI corresponding to the at least one first combination fed back by the UE. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

Figure 6:
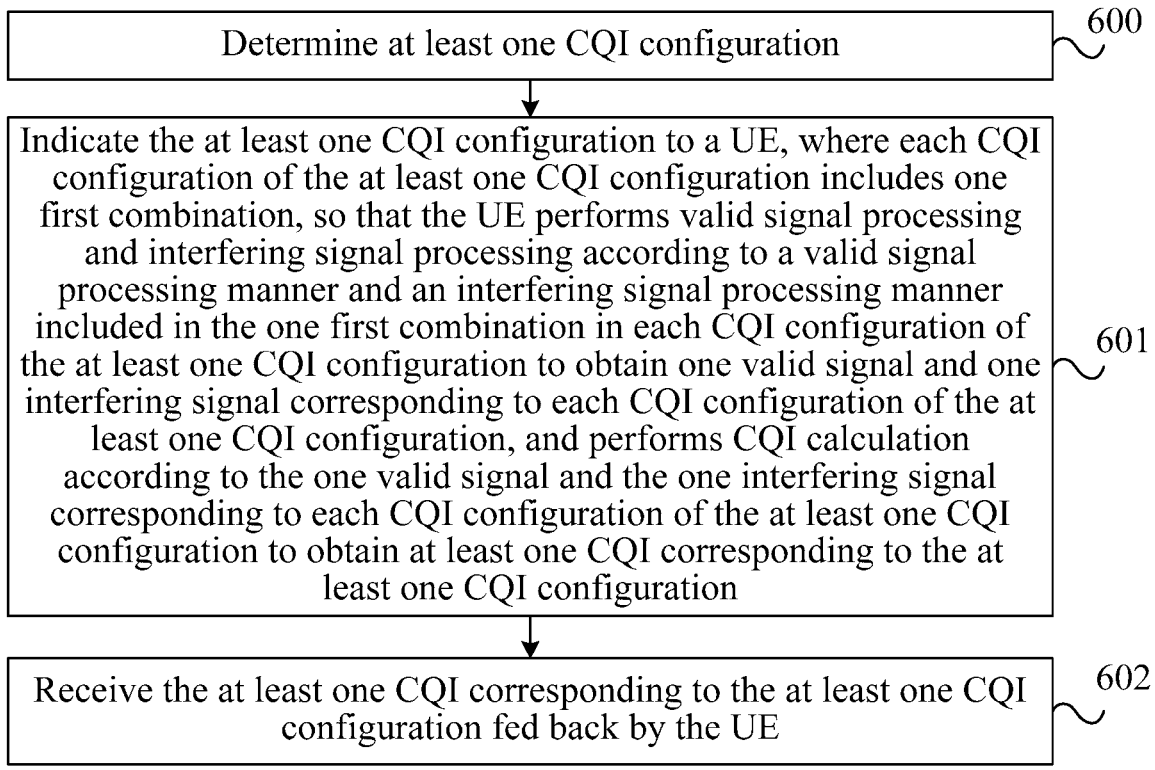
FIG. 6 is a flow chart of a method for measuring a CQI according to yet another embodiment of the present invention.

FIG. 6 is a flow chart of a method for measuring a CQI according to yet another embodiment of the present invention. The execution body of the method for measuring a CQI of this embodiment is still a base station. As shown in FIG.

6, in the method for measuring a CQI of this embodiment, the technical solution of the present invention is further introduced in more detail on a basis of the embodiment shown in FIG. 4. As shown in FIG. 6, the method for measuring a CQI of this embodiment may specifically include the following steps.

600: Determine at least one CQI configuration.

In this embodiment, each CQI configuration includes one first combination.

601: Indicate the at least one CQI configuration to a UE, where each CQI configuration of the at least one CQI configuration includes one first combination, so that the UE performs valid signal processing and interfering signal processing according to a valid signal processing manner and an interfering signal processing manner included in the one first combination in each CQI configuration of the at least one CQI configuration to obtain one valid signal and one interfering signal corresponding to each CQI configuration of the at least one CQI configuration, and performs CQI calculation according to the one valid signal and the one interfering signal corresponding to each CQI configuration of the at least one CQI configuration to obtain at least one CQI corresponding to the at least one CQI configuration.

602: Receive the at least one CQI corresponding to the at least one CQI configuration fed back by the UE.

In this embodiment, each CQI configuration, a first combination corresponding to the CQI configuration, and a CQI corresponding to the CQI configuration are in one-to-one correspondence.

Specifically, 600 to 602 in this embodiment are specifically a procedure of detailing step 400 to step 402 in the embodiment shown in FIG. 4. Also, the difference between the technical solution of this embodiment and the technical solution of the embodiment shown in FIG. 3 only lies in that: in the embodiment shown in FIG. 3, the technical solution of the embodiment of the present invention is described at the UE side, while in this embodiment, the technical solution of the embodiment of the present invention is described at the base station side; for details, reference may also be made to the record of the embodiment shown in FIG. 3, and details are not repeatedly described herein.

The method for measuring a CQI of this embodiment may at least be applied to a scenario in which various different multi-node collaboration technologies are used as collaboration methods in a multi-node collaboration system, and each collaboration method corresponds to one type of CQI configuration. For example, the base station, during scheduling, may select and use one of joint transmission/collaboration scheduling/dynamic node as a manner for the UE to transmit data, so the UE needs to calculate a CQI corresponding to the collaboration method of joint transmission/collaboration scheduling/dynamic node and feed the CQI back to the base station, and therefore the base station selects a collaboration method to schedule the UE. Also the base station may further implement switching among various collaboration methods.

In the method for measuring a CQI of this embodiment, a base station determines at least one CQI configuration; indicates the at least one CQI configuration to a UE, where each CQI configuration of the at least one CQI configuration includes one first combination, so that the UE performs valid signal processing and interfering signal processing according to a valid signal processing manner and an interfering signal processing manner included in the one first combination in each CQI configuration of the at least one CQI configuration to obtain one valid signal and one interfering signal corresponding to each CQI configuration of the at least one CQI configuration, and performs CQI calculation according to the one valid signal and the one interfering signal corresponding to each CQI configuration of the at least one CQI configuration to obtain at least one CQI corresponding to the at least one CQI configuration; and receives the at least one CQI corresponding to the at least one CQI configuration fed back by the UE. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

Optionally, in 401, 501 and 601 in the embodiments shown in FIG. 4, FIG. 5 and FIG. 6, when a base station indicates a CQI configuration to a UE (no matter whether there is one CQI or a plurality of CQIs, and no matter whether one CQI includes one first combination or includes a plurality of first combinations), the following manner may be adopted to indicate the CQI configuration to the UE:

(i) Send, to a UE, a bitmap used for indicating the CQI configuration, so that the UE determines, according to a CQI configuration included in the bitmap, a CQI configuration used for calculating the CQI; or (ii) Send, to a UE, a bitmap used for indicating the CQI configuration and an index number used for indicating a configuration used for calculating the CQI, so that the UE determines, according to the bitmap and the index number, a CQI configuration used for calculating the CQI; or (iii) Send, to a UE, an index number of a CQI configuration used for calculating a CQI, so that the UE determines, according to a bitmap used for calculating a CQI and set in a UE and the index number, a CQI configuration used for calculating the CQI.

In the embodiment, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

Further optionally, the precoding processing manner of performing precoding processing on a signal includes: a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

Further optionally, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the CQI is long-term statistical interference or instantaneous interference.

The valid signal processing manner and the interference processing manner in the embodiments shown in FIG. 4, FIG. 5 and FIG. 6 of the UE side are the same as the valid signal processing manner and the interference processing manner in the embodiments shown in FIG. 1, FIG. 2 and FIG. 3 of the base station side; for details, reference may also be made to the record of the embodiment of the base station side, and details are not repeatedly described herein.

In the process that the UE calculates a CQI, when a first combination includes one or more valid signal processing manners and one or more interfering signal processing manners, the UE may obtain one or more valid signals and one or more interfering signals for this first combination. The UE may first process a valid signal and an interfering signal and then calculate a CQI according to the valid signal and the interfering signal obtained through processing, or may also directly calculate a CQI according to a valid signal and an interfering signal which are obtained.

When the UE obtains one valid signal according to a plurality of valid signal processing manners included in one first combination, the UE first obtains one valid signal according to each corresponding valid signal processing manner, and then obtains one valid signal used for calculating a CQI according to the following manners:

perform maximum ratio combining or weighting combining or equal ratio combining on a plurality of valid signals of all obtained valid signals; or select a maximum or minimum valid signal from a plurality of obtained valid signals of all obtained valid signals; or perform statistical averaging or statistical processing on a plurality of obtained valid signals of all obtained valid signals to obtain a statistical average.

When the UE obtains an interfering signal according to a plurality of interfering signal processing manners included in one first combination, the UE first obtains one interfering signal according to each corresponding interfering signal processing manner, and then obtains one interfering signal used for calculating a CQI according to the following manners:

perform maximum ratio combining or weighting combining or equal ratio combining on a plurality of obtained interfering signals of all obtained interfering signals; or select a maximum or minimum interfering signal from a plurality of obtained interfering signals of all obtained interfering signals; or perform statistical averaging or statistical processing on a plurality of obtained interfering signals of all obtained interfering signals to obtain a statistical average.

When the UE calculates a CQI according to one valid signal and a plurality of interfering signals which are obtained, the UE may obtain, through calculation, one CQI according to the one valid signal and each interfering signal of the plurality of interfering signals, thereby obtaining a plurality of CQIs.

When the UE calculates a CQI according to a plurality of valid signals and one interfering signal which are obtained, the UE may obtain, through calculation, one CQI according to each valid signal of the plurality of valid signals and the one interfering signal, thereby obtaining a plurality of CQIs.

When the UE obtains a plurality of valid signals and a plurality of interfering signals, the UE may obtain, through calculation, one CQI according to each valid signal of the plurality of valid signals and each interfering signal of the plurality of interfering signals, thereby obtaining a plurality of CQIs.

When the UE feeds back a CQI, the UE may perform the feedback in the following several manners (when the UE obtains a plurality of valid signal processing manners or a plurality of interfering signal processing manners according to a first combination, if there is a processing valid signal or a processing interfering signal selected by the UE, or a processing CQI selected by the UE, the CQI may be fed back according to a predefined valid signal processing manner, an interfering signal processing manner selected by the user, a CQI processing manner selected by the user, or simultaneously a valid signal processing manner selected by the UE, an interfering signal processing manner selected by the UE, and a CQI processing manner selected by the UE corresponding to the CQI is fed back):

(1) A UE feeds back a CQI.

When the UE only obtains, through calculation, one CQI, the UE feeds back the CQI.

When the UE obtains, through calculation, a plurality of CQIs, the UE performs the following processing to obtain one CQI, and feeds back the CQI:

The UE selects one CQI from the plurality of CQIs obtained through calculation and feeds the selected CQI back to a base station; or The UE obtains, through processing, one CQI from the plurality of CQIs obtained through calculation and feeds the CQI back to a base station.

A selection manner may include: selecting a maximum or minimum CQI from a plurality of CQIs.

A processing manner includes: obtaining a statistical average by performing statistical processing or maximum ratio combining or weighting combining or equal ratio combining on SINRs corresponding to a plurality of CQIs, and then performing quantization on the statistical average to obtain a CQI to be fed back.

(2) A UE feeds back a plurality of CQIs.

The UE directly feeds a plurality of CQIs obtained through calculation back to a base station; or The UE divides a plurality of CQIs into several groups, obtains, through processing, one CQI for each group and feeds back the CQI. For processing of each group of CQIs, when the UE feeds back one CQI, the UE obtains, through processing, any one of various manners of one CQI from a plurality of CQIs; or The UE selects maximum M CQIs or minimum M CQIs from the plurality of CQIs obtained through calculation and feeds the selected CQIs back to the base station.

When the base station processes a CQI, the base station performs scheduling processing according to CQIs fed back by all UEs governed by the base station (and valid signal processing manners selected by the UEs, interfering signal processing manners selected by the UEs, and CQI processing manners selected by the UEs corresponding to the CQIs fed back by all the UEs) and other channel state information (such as PMI and RI), allocates time-frequency resources available for the base station, separately uses different time-frequency resources to provide a service to certain UEs, and determines an MCS, a precoding vector, the number of layers, and so on, which are used at the time of serving a corresponding UE.

The valid signal forming manner may include: specifically obtaining a valid signal in a direct adding manner or by using joint precoding processing when the valid signal is measured from several resources and obtained through processing.

The interfering signal forming manner may include: performing various adding or subtracting processing on several interfering signals which are obtained through measurement processing, such as, adding several interfering signals obtained through measurement processing, or subtracting another or several interfering signals obtained through measurement processing from one interfering signal obtained through measurement processing.

The following takes two examples for detailed description:

In an embodiment, a valid signal (from node 1) is obtained through measurement on resource 1; channels (which are channels from node 2 and node 3, respectively) are obtained through measurement performed on resource 2 and resource 3, respectively, corresponding processing (such as precoding processing and/or power adjustment) is performed on the obtained channels, and then the processed channels are used as a part of an interfering signal; interference is directly measured on resource 4 (the measured interference includes interference generated from all nodes other than the node 1, node 2, and node 3), and the interference is used as another part of the interfering signal; the two parts of the interfering signal are directly added to obtain the interfering signal used for calculating a CQI. This method corresponds to a scenario in which the node 2 and node 3 use interference coordination processing (such as precoding processing and/or power adjustment) corresponding to a CQI configuration.

In an embodiment, a valid signal (from node 1) is obtained through measurement on resource 1; channels are obtained through measurement performed on resource 2 and resource 3, respectively, corresponding processing (such as precoding processing and/or power adjustment) is performed on the obtained channels, the channels measured on resource 2 and resource 3, respectively are channels from node 2 and node 3, and signals obtained through measurement processing from the resource 2 and resource 3 are used as interfering signals from the node 2 and node 3; an interfering signal is directly measured on resource 4 (the measured interference includes interference generated from all nodes other than node 1, node 2, and node 3); the interfering signals obtained through measurement processing on the resource 2 and resource 3 are subtracted from the interfering signal measured on the resource 4 to obtain the interference used for calculating a CQI. This method corresponds to a scenario in which node 2 and node 3 use silence blanking.

Persons of ordinary skill in the art should understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a ROM, a RAM, a magnetic disk, or an optical disc.

Figure 7:
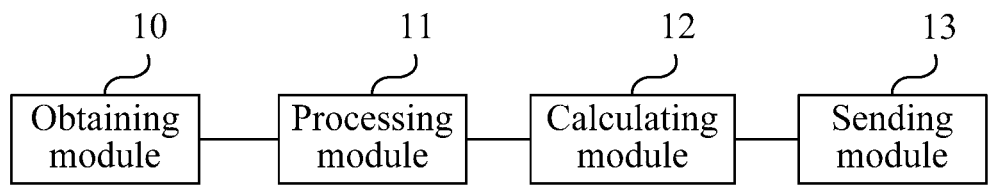
FIG. 7 is a schematic structural diagram of a UE according to an embodiment of the present invention.

FIG. 7 is a schematic structural diagram of a UE according to an embodiment of the present invention. As shown in FIG. 7, the UE of this embodiment may specifically include: an obtaining module 10, a processing module 11, a calculating module 12 and a sending module 13.

The obtaining module 10 is configured to obtain a CQI configuration, where the CQI configuration includes a first combination, and the first combination includes a valid signal processing manner and an interfering signal processing manner. The processing module 11 is connected to the obtaining module 10, and the processing module 11 is configured to perform valid signal processing and interfering signal processing according to the valid signal processing manner and the interfering signal processing manner in the first combination obtained by the obtaining module 10 to obtain a valid signal and an interfering signal. The calculating module 12 is connected to the processing module 11, and the calculating module 12 is configured to perform CQI calculation according to the valid signal and the interfering signal obtained by the processing module 11 to obtain a CQI. The sending module 13 is connected to the calculating module 12, and the sending module 13 is configured to feed the CQI obtained by the calculating module 12 through calculation back to a base station.

The UE of this embodiment may be applied to a multi-node collaboration system.

In the UE of this embodiment, a specific implementation mechanism of measuring a CQI by adopting the modules is the same as an implementation mechanism of the relevant method embodiment; for details, reference may be made to the record of the relevant method embodiment, and details are not repeatedly described herein.

The UE of this embodiment, by adopting the modules, can obtain a CQI configuration, where the CQI configuration includes a first combination, and the first combination includes a valid signal processing manner and an interfering signal processing manner; perform valid signal processing and interfering signal processing according to the valid signal processing manner and the interfering signal processing manner in the first combination to obtain a valid signal and an interfering signal; perform CQI calculation according to the valid signal and the interfering signal to obtain a CQI; and feed the CQI back to a base station. The technical solutions of the embodiments of the present invention can be applied to a multi-node collaboration system, so as to solve a defect of the prior art that CQI measurement cannot be applied to a multi-node collaboration system, and can provide an effective CQI measurement solution to the multi-node collaboration system.

On a basis of the UE of the shown embodiment, the following technical solution may be further included.

In the UE of this embodiment, the obtaining module 10 may be specifically configured to obtain a CQI configuration from the base station. For example, the obtaining module 10 may be specifically configured to receive higher-layer signaling carrying the CQI configuration and sent by the base station, where the higher-layer signaling includes RRC signaling.

Optionally, for example, in a scenario in which dynamic node selection or dynamic node silence is used as a collaboration method in a multi-node collaboration system to which the UE is applied, the obtaining module 10 in the UE of this embodiment is specifically configured to obtain one CQI configuration from a base station, where the CQI configuration includes at least one first combination. The processing module 11 is specifically configured to perform valid signal processing and interfering signal processing according to a valid signal processing manner and an interfering signal processing manner of each first combination of the at least one first combination to obtain one valid signal and one interfering signal corresponding to each first combination of the at least one first combination. The calculating module 12 is specifically configured to perform CQI calculation according to the one valid signal and the one interfering signal corresponding to each first combination of the at least one first combination obtained by the processing module 11 to obtain at least one CQI corresponding to the at least one first combination. The sending module 13 is specifically configured to feed the at least one CQI corresponding to the at least one first combination obtained by the calculating module 13 back to the base station.

Optionally, in a scenario in which various different multi-node collaboration technologies are used as collaboration methods in a multi-node collaboration system, each collaboration method corresponds to one type of CQI configuration. For example, the base station, during scheduling, may select and use one of joint transmission/collaboration scheduling/dynamic node as a manner for the UE to transmit data, so the UE needs to calculate a CQI corresponding to the collaboration method of joint transmission/collaboration scheduling/dynamic node and feed the CQI back to the base station, and therefore the base station selects a collaboration method to schedule the UE. Also the base station may further implement switching among various collaboration methods. In the scenario in which various different multi-node collaboration technologies are used as collaboration methods in a multi-node collaboration system, the obtaining module 10 in the UE of this embodiment is specifically configured to obtain at least one CQI configuration from the base station, where each CQI configuration of the at least one CQI configuration includes one first combination. The processing module 11 is specifically configured to perform valid signal processing and interfering signal processing according to the valid signal processing manner and the interfering signal processing manner included in the first combination in each CQI configuration of the at least one CQI configuration obtained by the obtaining module 10 to obtain one valid signal and one interfering signal corresponding to each CQI configuration of the at least one CQI configuration. The calculating module 12 is specifically configured to perform CQI calculation according to the one valid signal and the one interfering signal corresponding to each CQI configuration of the at least one CQI configuration obtained by the processing module 11 to obtain at least one CQI corresponding to the at least one CQI configuration. The sending module 13 is specifically configured to feed the at least one CQI corresponding to the at least one CQI configuration obtained by the calculating module 12 back to the base station.

Optionally, in the UE of this embodiment, the obtaining module 10 is specifically configured to obtain, from the base station, a bitmap used for indicating the CQI configuration, and determine, according to a CQI configuration included in the bitmap, a CQI configuration used for calculating the CQI; or the obtaining module 10 is specifically configured to obtain, from the base station, a bitmap used for indicating the CQI configuration and an index number used for indicating a configuration used for calculating the CQI, and determine, according to the bitmap and the index number, a CQI configuration used for calculating the CQI; or the obtaining module 10 is specifically configured to obtain, from the base station, an index number of a CQI configuration used for calculating a CQI, and determine, according to a bitmap used for calculating a CQI and set in a UE and the index number, a CQI configuration used for calculating the CQI.

Optionally, in the UE of this embodiment, specifically the obtaining module 10 may also obtain a CQI configuration, of the UE, set in the UE. In this case, correspondingly, the sending module 13 is specifically further configured to feed the CQI configuration used for calculating the CQI back to the base station, so as to inform the base station that the CQI fed back is calculated based on the CQI configuration. For example, the sending module 13 may be further specifically configured to feed, back to the base station, a bitmap used for indicating the CQI configuration, so that the base station determines, according to a CQI configuration included in the bitmap, a CQI configuration used for calculating the CQI; or the sending module 13 may be further specifically configured to feed, back to the base station, a bitmap used for indicating the CQI configuration and an index number used for indicating a configuration used for calculating the CQI, so that the base station determines, according to the bitmap and the index number, a CQI configuration used for calculating the CQI; or the sending module 13 may be further specifically configured to feed, back to the base station, an index number of a CQI configuration used for calculating a CQI, so that the base station determines, according to a bitmap used for calculating a CQI and set in the base station and the index number, a CQI configuration used for calculating the CQI.

Optionally, in the UE of this embodiment, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

Further optionally, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

Further optionally, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes: a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the CQI is long-term statistical interference or instantaneous interference.

The user equipment obtains a CQI configuration from the base station.

For the CQI configuration (1) the user equipment determines one or more combinations of a valid signal processing manner and an interfering signal processing manner;

(2) performs valid signal processing and interfering signal processing separately according to each combination of a valid signal processing manner and an interfering signal processing manner, and obtains, through calculation, one or more CQIs according to a valid signal and an interfering signal obtained after the processing; and (3) feeds the one or more CQIs obtained through calculation back to the base station; or the user equipment obtains a plurality of CQI configurations from the base station;

For each CQI configuration (1) the user equipment determines one combination of a valid signal processing manner and an interfering signal processing manner;

(2) performs valid signal processing and interfering signal processing according to the combination of a valid signal processing manner and an interfering signal processing manner, and obtains, through calculation, one CQI according to a valid signal and an interfering signal obtained after the processing; and (3) feeds the CQI obtained through calculation back to the base station.

In the UE of this embodiment, the various optional technical solutions may be put together to form an embodiment of the present invention. In an actual application, the various optional technical solutions may be combined in any combining manner to form an optional embodiment of the present invention.

In the UE of this embodiment, a specific implementation mechanism of measuring a CQI by adopting the modules is the same as an implementation mechanism of the relevant method embodiment; for details, reference may be made to the record of the relevant method embodiment, and details are not repeatedly described herein.

The UE of this embodiment, by adopting the modules, can solve a defect of the prior art that CQI measurement cannot be applied to a multi-node collaboration system, and can provide an effective CQI measurement solution to the multi-node collaboration system.

Figure 8:
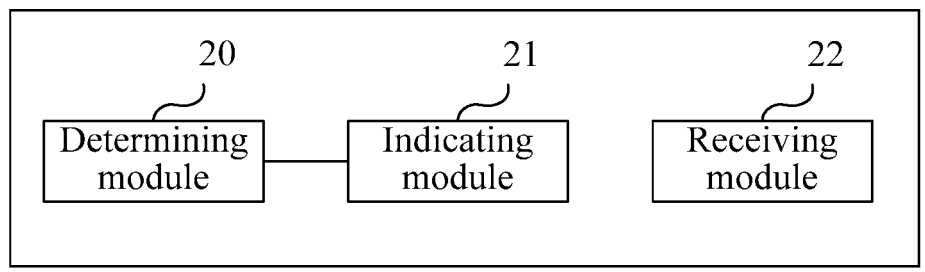
FIG. 8 is a schematic structural diagram of a base station according to an embodiment of the present invention.

FIG. 8 is a schematic structural diagram of a base station according to an embodiment of the present invention. As shown in FIG. 8, the base station of this embodiment may be applied to a multi-node collaboration system. The base station of this embodiment may specifically include: a determining module 20, an indicating module 21 and a receiving module 22.

In the base station of this embodiment, the determining module 20 is configured to determine a CQI configuration, where the CQI configuration includes a first combination, and the first combination includes a valid signal processing manner and an interfering signal processing manner. The indicating module 21 is connected to a determining module 20, and the indicating module 21 is configured to indicate the CQI configuration determined by the determining module 20 to a UE, so that the UE performs valid signal processing and interfering signal processing according to the valid signal processing manner and the interfering signal processing manner in the first combination to obtain a valid signal and an interfering signal, and performs CQI calculation according to the valid signal and the interfering signal to obtain a CQI. The receiving module 22 is configured to receive the CQI fed back by the UE.

In the base station of this embodiment, a specific implementation mechanism of measuring a CQI by adopting the modules is the same as an implementation mechanism of the relevant method embodiment; for details, reference may be made to the record of the relevant method embodiment, and details are not repeatedly described herein.

The base station of this embodiment, by adopting the modules, determines a CQI configuration; indicates the CQI configuration to a UE, so that the UE performs valid signal processing and interfering signal processing according to the valid signal processing manner and the interfering signal processing manner in the first combination to obtain a valid signal and an interfering signal, and performs CQI calculation according to the valid signal and the interfering signal to obtain a CQI; and receives the CQI fed back by the UE. The technical solution of this embodiment can be applied to a multi-node collaboration system, so as to solve a defect of the prior art that CQI measurement cannot be applied to a multi-node collaboration system, and can provide an effective CQI measurement solution to the multi-node collaboration system.

Optionally, for the base station in the embodiment, in a scenario in which dynamic node selection or dynamic node silence is used as a collaboration method in a multi-node collaboration system to which the base station is applied, the determining module 20 in the base station of the embodiment is specifically configured to determine one CQI configuration, where the one CQI configuration includes at least one first combination. The indicating module 21 is specifically configured to indicate the one CQI configuration determined by the determining module 20 to the UE, where the one CQI configuration includes at least one first combination, so that the UE performs valid signal processing and interfering signal processing according to a valid signal processing manner and an interfering signal processing manner of each first combination of the at least one first combination to obtain one valid signal and one interfering signal corresponding to each first combination of the at least one first combination, and performs CQI calculation according to the one valid signal and the one interfering signal corresponding to each first combination of the at least one first combination to obtain at least one CQI corresponding to the at least one first combination. The receiving module 22 is specifically configured to receive the at least one CQI corresponding to the at least one first combination fed back by the UE.

Optionally, in a scenario in which various different multi-node collaboration technologies are used as collaboration methods in a multi-node collaboration system, each collaboration method corresponds to one type of CQI configuration. For example, the base station, during scheduling, may select and use one of joint transmission/collaboration scheduling/dynamic node as a manner for the UE to transmit data, so the UE needs to calculate a CQI corresponding to the collaboration method of joint transmission/collaboration scheduling/dynamic node and feed the CQI back to the base station, and therefore the base station selects a collaboration method to schedule the UE. Also the base station may further implement switching among various collaboration methods. In the scenario in which various different multi-node collaboration technologies are used as collaboration methods in a multi-node collaboration system, the determining module 20 in the base station of the embodiment is specifically configured to determine at least one CQI configuration, where each CQI configuration of the at least one CQI configuration includes one first combination. The indicating module 21 is specifically configured to indicate the at least one CQI configuration determined by the determining module 20 to the UE, where each CQI configuration of the at least one CQI configuration includes one first combination, so that the UE performs valid signal processing and interfering signal processing according to a valid signal processing manner and an interfering signal processing manner in the one first combination included in each CQI configuration of the at least one CQI configuration to obtain one valid signal and one interfering signal corresponding to each CQI configuration of the at least one CQI configuration, and performs CQI calculation according to the one valid signal and the one interfering signal corresponding to each CQI configuration of the at least one CQI configuration to obtain at least one CQI corresponding to the at least one CQI configuration. The receiving module 22 is specifically configured to receive the at least one CQI corresponding to the at least one CQI configuration fed back by the UE.

Optionally, the indicating module 21 in the base station in the embodiment is specifically configured to send, to the UE, a bitmap used for indicating the CQI configuration, so that the UE determines, according to a CQI configuration included in the bitmap, a CQI configuration used for calculating the CQI; or the indicating module 21 is specifically configured to send, to the UE, a bitmap used for indicating the CQI configuration and an index number used for indicating a configuration used for calculating the CQI, so that the UE determines, according to the bitmap and the index number, a CQI configuration used for calculating the CQI; or the indicating module 21 is specifically configured to send, to the UE, an index number of a CQI configuration used for calculating a CQI, so that the UE determines, according to a bitmap used for calculating a CQI and set in a UE and the index number, a CQI configuration used for calculating the CQI.

Optionally, in the embodiment, the valid signal processing manner includes at least one of the following items: indication information used for indicating a resource bearing a valid signal, where the valid signal is obtained by measuring the resource; a precoding processing manner of performing precoding processing on a valid signal; information used for performing power adjustment on a valid signal; and a valid signal forming manner; and/or the interference processing manner includes at least one of the following items: indication information used for indicating a resource bearing an interfering signal, where the interfering signal is obtained by measuring the resource; an interfering signal measurement manner; a precoding processing manner of performing precoding processing on an interfering signal; information used for performing power adjustment on an interfering signal; an interfering signal forming manner; and interference feature information.

Further optionally, the precoding processing manner of performing precoding processing on a signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing.

Further optionally, the interfering signal measurement manner includes: measuring the interfering signal directly on the resource used for bearing the interfering signal and/or measuring interference generated by one or more nodes according to a resource bearing a channel of the one or more nodes; and/or the precoding processing manner of performing precoding processing on an interfering signal includes:

a manner indicating that precoding processing adopts beam forming; or a manner indicating that precoding processing adopts beam forming and a manner indicating that joint precoding processing is used; or a manner indicating that precoding processing adopts codebook-based precoding processing; or a manner indicating that precoding processing adopts codebook-based precoding processing, and information of a codebook used for selecting a precoding vector or a precoding matrix; or a manner indicating that precoding processing adopts codebook-based precoding processing, information of a codebook used for selecting a precoding vector or a precoding matrix, and information indicating that joint precoding processing is used; or a manner indicating that precoding processing adopts codebook-based precoding processing, information of a codebook used for selecting a precoding vector or a precoding matrix, information indicating that joint precoding processing is used, and information of adjusting a precoding vector or a precoding matrix involving in joint precoding at the time of using joint precoding processing; and/or the interference feature information includes information indicating that the interfering signal used for calculating the CQI is long-term statistical interference or instantaneous interference.

For details of the signal processing manner and the interference processing manner, reference may also be made to the record of the method embodiment, and details are not repeatedly described herein.

In the base station of the embodiment, a specific implementation mechanism of measuring a CQI by adopting the modules is the same as an implementation mechanism of the relevant method embodiment; for details, reference may be made to the record of the relevant method embodiment, and details are not repeatedly described herein.

The base station of the embodiment, by adopting the modules, can solve a defect of the prior art that CQI measurement cannot be applied to a multi-node collaboration system, and can provide an effective CQI measurement solution to the multi-node collaboration system.

Figure 9:
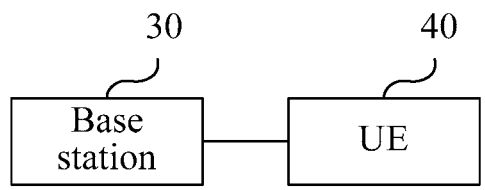
FIG. 9 is a schematic structural diagram of a system for measuring a CQI according to an embodiment of the present invention.

FIG. 9 is a schematic structural diagram of a system for measuring a CQI according to an embodiment of the present invention. As shown in FIG. 9, the system for measuring a CQI of this embodiment may specifically include a base station 30 and a UE 40.

The base station 30 is configured to determine a CQI configuration, where the CQI configuration includes a first combination, and the first combination includes a valid signal processing manner and an interfering signal processing manner; the base station 30 is further configured to indicate the determined CQI configuration to the UE 40. The UE 40 is configured to obtain the CQI configuration indicated by the base station 30, perform valid signal processing and interfering signal processing according to the valid signal processing manner and the interfering signal processing manner in the first combination in the CQI configuration to obtain a valid signal and an interfering signal, and perform CQI calculation according to the valid signal and the interfering signal to obtain a CQI; then the UE 40 feeds the obtained CQI back to the base station 30. The base station 30 is further configured to receive the CQI fed back by the UE 40.

For the base station 30 in the system for measuring a CQI of this embodiment, the base station in the embodiment shown in FIG. 9 may be specifically adopted, and for the UE 40, the UE of the embodiment shown in FIG. 7 or FIG. 8 may be specifically adopted. Specifically, the record of the relevant method embodiments in which a UE obtains a CQI configuration from a base station in FIG. 1 to FIG. 6 may be adopted, and details are not repeatedly described herein.

In the system for measuring a CQI of this embodiment, the base station is configured to determine a CQI configuration, where the CQI configuration includes a first combination, and the first combination includes a valid signal processing manner and an interfering signal processing manner; the base station is further configured to indicate the determined CQI configuration to the UE. The UE 40 is configured to obtain the CQI configuration indicated by the base station, perform valid signal processing and interfering signal processing according to the valid signal processing manner and the interfering signal processing manner in the first combination in the CQI configuration to obtain a valid signal and an interfering signal, and perform CQI calculation according to the valid signal and the interfering signal to obtain a CQI; then the UE feeds the obtained CQI back to the base station. The base station is further configured to receive the CQI fed back by the UE. With the technical solution of this embodiment, a defect of the prior art that CQI measurement cannot be applied to a multi-node collaboration system can be solved, and an effective CQI measurement solution can be provided to the multi-node collaboration system.

Figure 10:
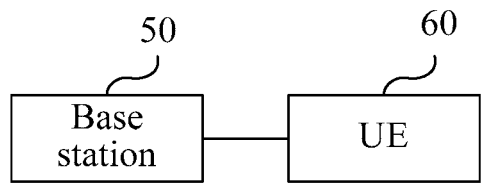
FIG. 10 is a schematic structural diagram of a system for measuring a CQI according to another embodiment of the present invention.

FIG. 10 is a schematic structural diagram of a system for measuring a CQI according to another embodiment of the present invention. As shown in FIG. 10, the system for measuring a CQI of this embodiment may specifically include a base station 50 and a UE 60.

The UE 60 is configured to obtain a CQI configuration set in the UE, where the CQI configuration includes a first combination, and the first combination includes a valid signal processing manner and an interfering signal processing manner; the UE 60 performs valid signal processing and interfering signal processing according to the valid signal processing manner and the interfering signal processing manner in the first combination to obtain a valid signal and an interfering signal; the UE 60 further performs CQI calculation according to the valid signal and the interfering signal obtained by a processing module to obtain a CQI; the UE 60 feeds the CQI and the CQI configuration obtained by a calculating module back to the base station 50. The base station 50 is further configured to receive the CQI and the CQI configuration fed back by the UE 60.

For the base station 50 in the system for measuring a CQI of this embodiment, the base station in the embodiment shown in FIG. 9 may be specifically adopted, and for the UE 60, the UE of the embodiment shown in FIG. 7 may be specifically adopted. Specifically, the record of the relevant method embodiments where a UE obtains a CQI configuration set in the UE involved in FIG. 1 to FIG. 6 may be adopted, and details are not repeatedly described herein.

In the system for measuring a CQI of this embodiment, the UE is configured to obtain a CQI configuration set in the UE, where the CQI configuration includes a first combination, and the first combination includes a valid signal processing manner and an interfering signal processing manner; the UE performs valid signal processing and interfering signal processing according to the valid signal processing manner and the interfering signal processing manner in the first combination to obtain a valid signal and an interfering signal; the UE further performs CQI calculation according to the valid signal and the interfering signal obtained by a processing module to obtain a CQI; the UE feeds the CQI and the CQI configuration obtained by a calculating module back to the base station. The base station is further configured to receive the CQI and the CQI configuration fed back by the UE. With the technical solution of this embodiment, a defect of the prior art that CQI measurement cannot be applied to a multi-node collaboration system can be solved, and an effective CQI measurement solution can be provided to the multi-node collaboration system.

A part of the modules in the apparatuses may be implemented through software, and the software is stored in a storage medium. For other description of the apparatus embodiments, reference may be made to the aforementioned method embodiments.

The apparatus embodiments are merely exemplary, and units described as separate components may be or may not be physically separated. Components shown as units may be or may not be physical units, that is, may be integrated or distributed to at least two network units. Some or all of the modules may be selected according to an actual requirement, so as to achieve the objective of the solution of the embodiment. Persons of ordinary skill in the art may understand and implement the embodiments without creative efforts.

Finally, it should be noted that, the foregoing embodiments are merely intended for describing the technical solutions of the present invention, other than limiting the present invention. Although the present invention is described in detail with reference to the foregoing embodiments, persons of ordinary skill in the art should understood that they may still make modifications to the technical solutions described in the foregoing embodiments, or make equivalent replacements to part of the technical features of the technical solutions recorded in the foregoing embodiments; however, these modifications or replacements do not make the essence of the corresponding technical solutions depart from the scope of the technical solutions of the embodiments of the present invention.

What is claimed is:

1. A method, performed by a terminal device, for providing a channel quality indicator (CQI) value to a base station, the method comprising:

receiving, from the base station, resource settings comprising a first resource setting for performing a valid signal measurement and a second resource setting for performing a first interference signal measurement;

obtaining a valid signal measurement result by performing the valid signal measurement based on the first resource setting;

obtaining a first interference signal measurement result by performing the first interference signal measurement based on the second resource setting;

determining the CQI according to the valid signal measurement result and the first interference signal measurement result; and sending the CQI to the base station.

2. The method according to claim 1, wherein the resource settings further comprises a third resource setting for performing a second interference signal measurement;

the method further comprises:

obtaining a second interference signal measurement result by performing the second interference signal measurement;

and the determining comprises:

determining the CQI according to the valid signal measurement result, the first interference signal measurement result, and the second interference signal measurement result.

3. The method according to claim 1, wherein the resource settings comprises an interfering signal forming manner.

4. The method according to claim 1, wherein the receiving, from the base station, the resource settings comprises:

receiving the resource settings by a radio resource control (RRC) signaling.

5. A terminal device, comprising:

a processor; and a non-transitory storage medium including executable instructions;

wherein the executable instructions, when executed by the processor, cause the terminal device to carry out a method for providing a channel quality indicator (CQI) value to a base station, the method comprising:

receiving, from the base station, resource settings comprising a first resource setting for performing a valid signal measurement and a second resource setting for performing a first interference signal measurement;

obtaining a valid signal measurement result by performing the valid signal measurement based on the first resource setting;

obtaining a first interference signal measurement result by performing the first interference signal measurement based on the second resource setting;

determining the CQI according to the valid signal measurement result and the first interference signal measurement result; and sending the CQI to the base station.

6. The terminal device according to claim 5, wherein the resource settings further comprises a third resource setting for performing a second interference signal measurement; and the instructions comprise instructions causing the terminal device to:

obtain a second interference signal measurement result by performing the second interference signal measurement; and determine the CQI according to the valid signal measurement result, the first interference signal measurement result, and the second interference signal measurement result.

7. The terminal device according to claim 5, wherein the resource setting comprises an interfering signal forming manner.

8. The terminal device according to claim 5, wherein the instructions comprise instructions causing the terminal device to receive the resource settings by a radio resource control (RRC) signaling.

9. A method, performed by a base station, for obtaining a channel quality indicator (CQI) value, the method comprising:
sending, to a terminal device, resource settings comprising a first resource setting for performing a valid signal measurement and a second resource setting for performing a first interference signal measurement;
receiving, in response to the sending the resource settings, the CQI from the terminal device;
wherein the CQI is based on a valid signal measurement result of the valid signal measurement and a first interference signal measurement result of the first interference signal measurement.

10. The method according to claim 9, wherein:
the resource settings further comprises a third resource setting for performing a second interference signal measurement; and
the CQI is based on the valid signal measurement result of the valid signal measurement, the first interference signal measurement result of the first interference signal measurement, and a second interference signal measurement result of the second interference signal measurement.

11. The method according to claim 9, wherein the resource settings comprises an interfering signal forming manner.

12. The method according to claim 9, wherein the sending the resource settings comprises:
sending, to the terminal device, the resource settings by a radio resource control (RRC) signaling.

13. A base station, comprising:
a processor; and
a non-transitory storage medium including executable instructions;
wherein the executable instructions, when executed by the processor, cause the base station to carry out a method for obtaining a channel quality indicator (CQI) value, the method comprising:
sending, to a terminal device, a resource settings comprising a first resource setting for performing a valid signal measurement and a second resource setting for performing an interference signal measurement;
receiving, in response to the sending the resource settings, the CQI from the terminal device;
wherein the CQI is based on a valid signal measurement result of the valid signal measurement and a first interference signal measurement result of the first interference signal measurement.

14. The base station according to claim 13, wherein:
the resource settings further comprises a third resource setting for performing a second interference signal measurement; and
the CQI is based on the valid signal measurement result of the valid signal measurement, the first interference signal measurement result of the first interference signal measurement, and a second interference signal measurement result of the second interference signal measurement.

15. The base station according to claim 13, wherein the resource settings comprises an interfering signal forming manner.

16. The base station according to claim 13, wherein the sending the resource settings comprises sending, to the terminal device, the resource settings by a radio resource control (RRC) signaling.

* * * * *